(12) United States Patent
Tsuji et al.

(10) Patent No.: US 11,459,446 B2
(45) Date of Patent: Oct. 4, 2022

(54) FLAME RETARDANT CONTAINING AROMATIC PHOSPHORIC ACID ESTER, AND THERMOPLASTIC RESIN COMPOSITION CONTAINING SAME

(71) Applicant: DAIHACHI CHEMICAL INDUSTRY CO., LTD., Osaka (JP)

(72) Inventors: Hiroshi Tsuji, Osaka (JP); Sakiko Hamada, Osaka (JP)

(73) Assignee: DAIHACHI CHEMICAL INDUSTRY CO., LTD., Osaka (JP)

( * ) Notice: Subject to any disclaimer, the term of this patent is extended or adjusted under 35 U.S.C. 154(b) by 56 days.

(21) Appl. No.: 16/965,818

(22) PCT Filed: Dec. 25, 2018

(86) PCT No.: PCT/JP2018/047509
§ 371 (c)(1),
(2) Date: Jul. 29, 2020

(87) PCT Pub. No.: WO2019/159540
PCT Pub. Date: Aug. 22, 2019

(65) Prior Publication Data
US 2021/0054173 A1 Feb. 25, 2021

(30) Foreign Application Priority Data
Feb. 16, 2018 (JP) .............................. JP2018-026086

(51) Int. Cl.
*C08K 5/521* (2006.01)
*C08L 25/06* (2006.01)
(Continued)

(52) U.S. Cl.
CPC .............. *C08K 5/521* (2013.01); *C08L 25/06* (2013.01); *C08L 67/02* (2013.01); *C08L 69/00* (2013.01); *C08L 2201/02* (2013.01)

(58) Field of Classification Search
CPC ......... C08K 5/521; C08L 25/06; C08L 67/02; C08L 69/00; C08L 2201/02
See application file for complete search history.

(56) References Cited

U.S. PATENT DOCUMENTS

2001/0049407 A1 12/2001 Otsuki
2002/0137821 A1 9/2002 Seidel et al.
(Continued)

FOREIGN PATENT DOCUMENTS

CN 1653133 A 8/2005
JP 11-343382 12/1999
(Continued)

OTHER PUBLICATIONS

ISR issued in International Patent Application No. PCT/JP2018/047509, dated Apr. 9, 2019, English translation.
(Continued)

*Primary Examiner* — John E Uselding
(74) *Attorney, Agent, or Firm* — Greenblum & Bernstein, P.L.C.

(57) ABSTRACT

A flame retardant containing an aromatic phosphoric acid ester represented by the general formula (I):
(Continued)

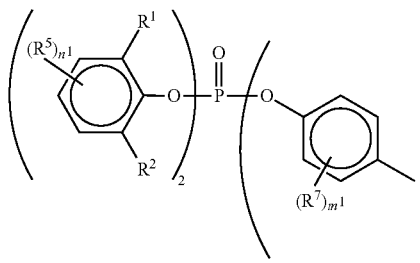

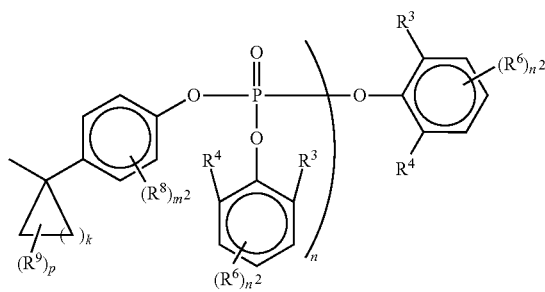

wherein $R^1$ to $R^4$, $R^7$, and $R^8$ each independently represent a $C_{1-4}$ alkyl group or a $C_{1-4}$ alkoxy group; $R^5$, $R^6$, and $R^9$ each independently represent a $C_{1-10}$ alkyl group or a $C_{1-10}$ alkoxy group; n represents an integer of 1 to 10; $n^1$ and $n^2$ each independently represent an integer of 0 to 3; $m^1$ and $m^2$ each independently represent an integer of 0 to 4; p represents an integer of 0 to 26; and k represents an integer of 1 to 12; and when p is 2 or more, any two substituents $R^9$ may be bonded to each other, and may be bonded to a carbon atom(s) of a ring to which the above substituents $R^9$ are bonded, forming another ring.

7 Claims, 9 Drawing Sheets

(51) Int. Cl.
    *C08L 67/02* (2006.01)
    *C08L 69/00* (2006.01)

(56) References Cited

U.S. PATENT DOCUMENTS

2003/0191250 A1  10/2003  Seidel et al.
2013/0289177 A1* 10/2013  Eckel .................. C08L 25/12
                                                524/127

FOREIGN PATENT DOCUMENTS

| JP | 2000-038397 A |   | 2/2000 |         |
|----|---------------|---|--------|---------|
| JP | 2000-063391 A |   | 2/2000 |         |
| JP | 2000-038397 A | * | 8/2000 | ............... C07F 9/12 |
| JP | 2001-200131 A |   | 7/2001 |         |
| JP | 2004-527474 A |   | 9/2004 |         |
| JP | 2010-006965 A |   | 1/2010 |         |

OTHER PUBLICATIONS

IPRP issued in International Patent Application No. PCT/JP2018/047509, dated Aug. 18, 2020, English translation.

* cited by examiner

FLAME RETARDANT CONTAINING AROMATIC PHOSPHORIC ACID ESTER, AND THERMOPLASTIC RESIN COMPOSITION CONTAINING SAME

TECHNICAL FIELD

The present invention relates to an (aromatic diphosphate-based) flame retardant containing an aromatic phosphoric acid ester that is capable of imparting flame retardancy to a thermoplastic resin, to which the flame retardant is added, and also capable of improving heat flowability, heat resistance, hydrolysis resistance, and bleed resistance of the thermoplastic resin, and also relates to a thermoplastic resin composition containing the flame retardant.

BACKGROUND ART

Thermoplastic resins, such as polycarbonate resins, polyester resins, polyolefin resins, polyamide resins, and polystyrene resins, have excellent chemical and physical properties and are thus used for a wide range of purposes, such as building materials, automotive parts, clothing and household goods, and housing materials for home appliances. In the meanwhile, since these thermoplastic resins are flammable, it may be necessary to impart flame retardancy to the thermoplastic resins according to the purpose; and various flame retardants have been researched and developed to date.

Examples of the flame retardants include inorganic compounds, organophosphorus compounds, organohalogen compounds, and halogen-containing organophosphorus compounds; and out of these compounds, the organohalogen compounds and the halogen-containing organophosphorus compounds exert an excellent flame-retardant effect. However, these halogen-containing compounds are pyrolyzed during the process of molding a resin and generate a hydrogen halide, leading to problems such as corroding a metal mold, deteriorating the resin itself, causing coloration, and degrading a working environment. Another problem is that the halogen-containing compounds generate a toxic gas such as a hydrogen halide, which is harmful to human bodies, when in a fire or incineration.

Therefore, halogen-free flame retardants are desired.

As examples of such flame retardants there may be mentioned inorganic compounds, such as magnesium hydroxide and aluminum hydroxide, and nitrogen compounds, such as melamine cyanurate, melamine phosphate, and melamine polyphosphate. However, the inorganic compounds and the nitrogen compounds are significantly low in flame-retardant effect, and thus need to be added in a large amount so as to provide the effect sufficiently, causing a problem such as degradation of physical properties intrinsic to resins.

As flame retardants that are halogen-free and are capable of providing a relatively good flame-retardant effect, there may be mentioned organophosphorus compounds; and among the organophosphorus compounds, organophosphoric acid esters are commonly used.

As the representative organophosphoric acid ester, triphenyl phosphate (TPP) is well known. TPP, however, has properties of being less heat-resistant and highly volatile.

While performance plastics that have been developed in recent years, such as engineering plastics and super engineering plastics, require a temperature as high as approximately 300° C. for molding processing, TPP is not proof against such a high temperature.

As flame retardants having thermostability and low volatility there may be mentioned aromatic diphosphate-based flame retardants.

Generally, organophosphoric acid ester-based flame retardants, such as the aromatic diphosphate-based flame retardants, not only impart flame retardancy to resins but also have an effect of enhancing heat flowability of the resins. Thus, the aromatic diphosphate-based flame retardants have advantages of enhancing the heat flowability of the thermoplastic resins and improving the moldability of the resins; however, the aromatic diphosphate-based flame retardants also have problems of lowering a heat deformation temperature and thus failing to meet heat resistance requirements of the resins, depending on its use application.

Further, there is another problem that under severe conditions such as high humidity, the aromatic diphosphate-based flame retardants cause hydrolysis, which degrades the resins.

Furthermore, bleed-out can be a problem for some resins, such as polyester resins.

As described above, the various aromatic diphosphate-based flame retardants have been researched and developed to date.

For example, Japanese Unexamined Patent Application Publication No. 2000-38397 (Patent Document 1) and Japanese Unexamined Patent Application Publication No. 2000-63391 (Patent Document 2) disclose that when an aromatic diphosphate-based flame retardant having a tetramethyl bisphenol F skeleton is added to a resin, the flame retardant suppresses a decrease in physical properties of the resin and enhances heat resistance of the resin. However, although the heat resistance is enhanced, heat flowability of the resin is reduced, causing insufficient moldability of the resin.

National Publication of Japanese Translation of PCT Application No. 2004-527474 (Patent Document 3) discloses that an aromatic diphosphate-based flame retardant having a bisphenol skeleton with an aliphatic ring structure in a cross-linked group achieves both heat flowability and heat resistance when added to a resin. However, there is no description of hydrolysis resistance and bleed resistance in PTL 3. The inventors of the present invention have evaluated the compounds specifically exemplified in PTL 3 and concluded that the hydrolysis resistance and the bleed resistance of these compounds are not sufficient.

Japanese Unexamined Patent Application Publication No. 2010-6965 (Patent Document 4) discloses that an aromatic diphosphate-based flame retardant having a biphenol skeleton is less likely to bleed out when added to a polyester resin. Although the bleed resistance of the aromatic diphosphate-based flame retardant is slightly improved, it is still not enough; and additionally, heat flowability of the aromatic diphosphate-based flame retardant is not good enough.

Consequently, the development of aromatic diphosphate-based flame retardants is awaited that are capable of exerting excellent effects such as improving not only flame retardancy but also heat flowability and heat resistance of thermoplastic resins, as well as hydrolysis resistance and bleed resistance of the resins.

CITATION LIST

Patent Literatures

Patent Document 1: Japanese Unexamined Patent Application Publication No. 2000-38397

Patent Document 2: Japanese Unexamined Patent Application Publication No. 2000-63391

Patent Document 3: National Publication of Japanese Translation of PCT Application No. 2004-527474

Patent Document 4: Japanese Unexamined Patent Application Publication No. 2010-6965

SUMMARY OF INVENTION

Technical Problem

The present invention has an object of providing an (aromatic diphosphate-based) flame retardant containing an aromatic phosphoric acid ester that is capable of imparting flame retardancy to a thermoplastic resin and also capable of improving heat flowability, heat resistance, hydrolysis resistance, and bleed resistance of the thermoplastic resin, and also providing a thermoplastic resin composition containing the flame retardant.

Solution to Problem

As a result of diligent research to achieve the above object, the inventors of the present invention found that an aromatic diphosphate having both bisphenol having a specific aliphatic ring in a cross-linked structure and an aromatic ring structure having a substituent at the ortho position can achieve the above object, and completed the present invention.

The present invention provides a flame retardant containing an aromatic phosphoric acid ester represented by the general formula (I):

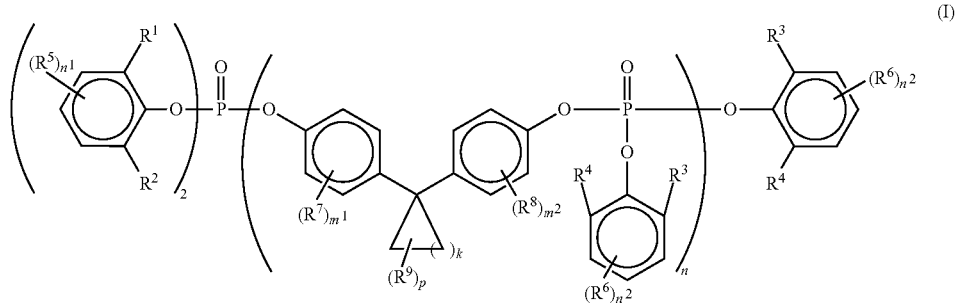

wherein $R^1$ to $R^4$, $R^7$, and $R^8$ each independently represent a $C_{1-4}$ alkyl group or a $C_{1-4}$ alkoxy group; $R^5$, $R^6$, and $R^9$ each independently represent a $C_{1-10}$ alkyl group or a $C_{1-10}$ alkoxy group; n represents an integer of 1 to 10; $n^1$ and $n^2$ each independently represent an integer of 0 to 3; $m^1$ and $m^2$ each independently represent an integer of 0 to 4; p represents an integer of 0 to 26; and k represents an integer of 1 to 12; and when p is 2 or more, any two substituents $R^9$ may be bonded to each other, and may be bonded to a carbon atom(s) of a ring to which the above substituents $R^9$ are bonded, forming another ring.

The present invention provides a thermoplastic resin composition containing the above-described flame retardant and a thermoplastic resin.

Advantageous Effects of Invention

The present invention can provide an (aromatic diphosphate-based) flame retardant containing an aromatic phosphoric acid ester that is capable of imparting flame retardancy to a thermoplastic resin and also capable of improving heat flowability, heat resistance, hydrolysis resistance, and bleed resistance of the thermoplastic resin, and can also provide a thermoplastic resin composition containing the flame retardant.

Therefore, the above flame retardant can be suitably used not only as a flame retardant for a resin for housing used for electronic equipment such as personal computers and printers, which has been used in the past, but also as a flame retardant for a resin for members of electrical parts such as switches, plugs, and sockets having complex shapes.

The flame retardant of the present invention exhibits the above advantageous effects more when any one of the following conditions (1) to (3) is satisfied:

(1) The aromatic phosphoric acid ester is represented by the general formula (I) wherein n represents 1, p represents an integer of 0 to 10, and k represents 4.

(2) The aromatic phosphoric acid ester is represented by the general formula (I) where n represents 1, p represents an integer of 0 to 22, and k represents 10.

(3) The aromatic phosphoric acid ester is any of aromatic phosphoric acid esters 1 to 4 described in Embodiments.

The thermoplastic resin composition of the present invention exhibits the above advantageous effects more when any one of the following conditions (4) to (8) is satisfied:

(4) The thermoplastic resin is a polycarbonate resin.

(5) The thermoplastic resin mentioned in (4) above further contains a styrene resin.

(6) The thermoplastic resin is a polyester resin.

(7) The polyester resin mentioned in (6) above is polybutylene terephthalate.

(8) An amount of the flame retardant is 1 to 50 parts by mass with respect to 100 parts by mass of the thermoplastic resin.

DESCRIPTION OF EMBODIMENTS

Figure 1:
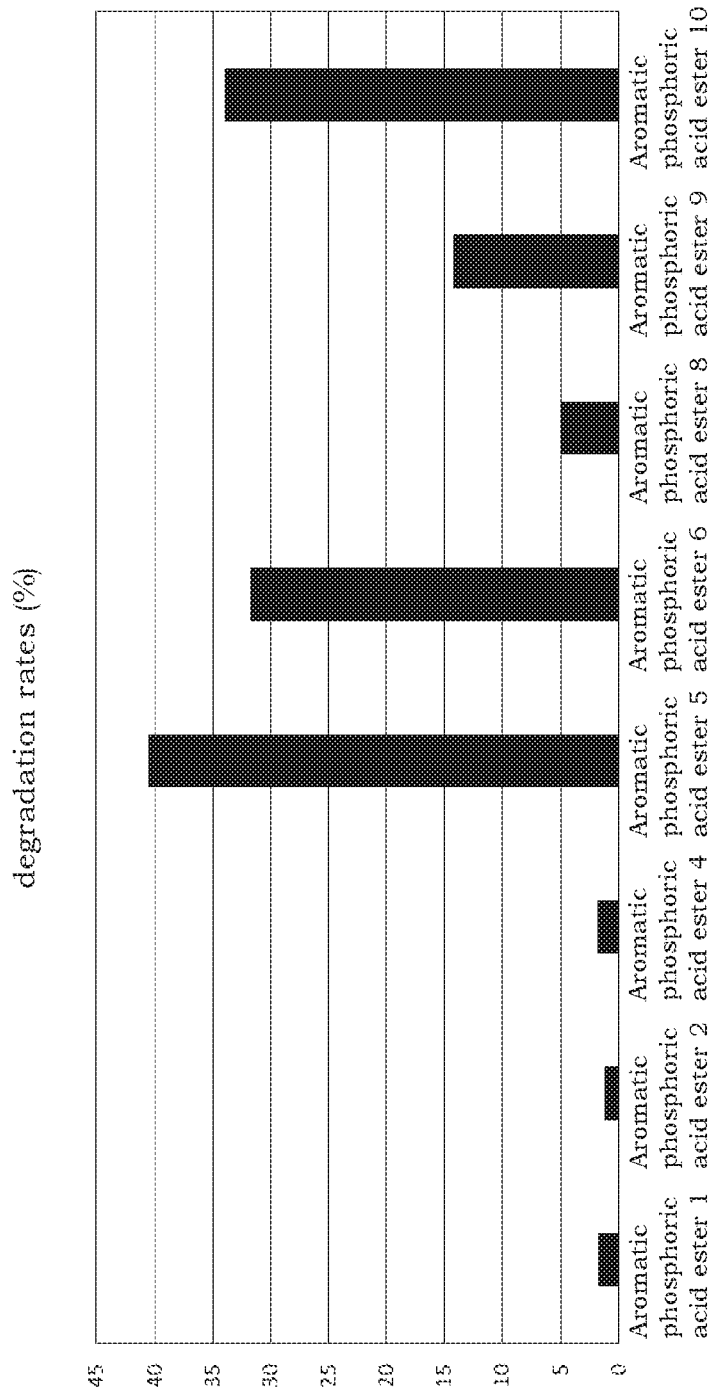
FIG. 1 shows degradation (dissociation) rates of aromatic phosphoric acid esters after a hydrolysis resistance test.

1. Flame Retardant Containing Aromatic Phosphoric Acid Ester

A flame retardant of the present invention is characterized by containing an aromatic phosphoric acid ester represented by the general formula (I):

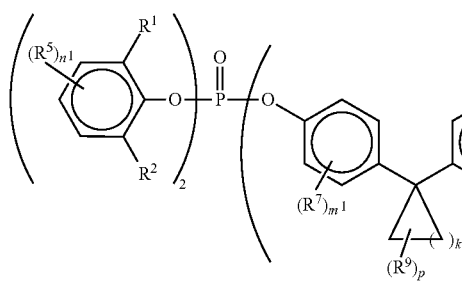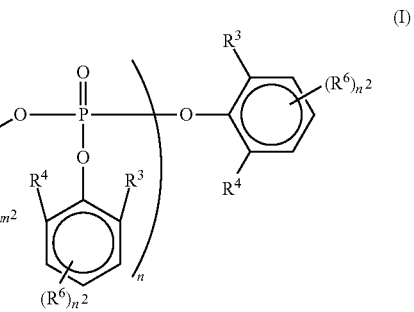

wherein $R^1$ to $R^4$, $R^7$, and $R^8$ each independently represent a $C_{1-4}$ alkyl group or a $C_{1-4}$ alkoxy group; $R^5$, $R^6$, and $R^9$ each independently represent a $C_{1-10}$ alkyl group or a $C_{1-10}$ alkoxy group; n represents an integer of 1 to 10; $n^1$ and $n^2$ each independently represent an integer of 0 to 3; $m^1$ and $m^2$ each independently represent an integer of 0 to 4; p represents an integer of 0 to 26; and k represents an integer of 1 to 12; and when p is 2 or more, any two substituents $R^9$ may be bonded to each other, and may be bonded to a carbon atom(s) of a ring to which the above substituents $R^9$ are bonded, forming another ring.

The substituents $R^1$ to $R^4$, $R^7$, and $R^8$ in the general formula (I) represent the $C_{1-4}$ alkyl group, preferably a $C_{1-3}$ alkyl group, and more preferably a $C_{1-2}$ alkyl group, or represent the $C_{1-4}$ alkoxy group, preferably a $C_{1-3}$ alkoxy group, and more preferably a $C_{1-2}$ alkoxy group. When the carbon number falls within the above-mentioned ranges, hydrolysis resistance of the aromatic phosphoric acid ester is enhanced; and the aromatic phosphoric acid ester is relatively easily synthesized.

The $C_{1-4}$ alkyl group may be linear or branched; and examples of the $C_{1-4}$ alkyl group include a methyl group, an ethyl group, an n-propyl group, an isopropyl group, an n-butyl group, an isobutyl group, and a tert-butyl group.

Of the above-listed alkyl groups, the methyl group, the ethyl group, the n-propyl group, and the isopropyl group are preferable; and the methyl group and the ethyl group are particularly preferable.

The $C_{1-4}$ alkoxy group may be linear or branched; and examples of the $C_{1-4}$ alkoxy group include a methoxy group, an ethoxy group, an n-propoxy group, an isopropoxy group, an n-butoxy group, an isobutoxy group, and a tert-butoxy group.

Of the above-listed alkoxy groups, the methoxy group, the ethoxy group, the n-propoxy group, and the isopropoxy group are preferable; and the methoxy group and the ethoxy group are particularly preferable.

The substituents R5, R6, and R9 in the general formula (I) represent the C1-10 alkyl group, preferably a C1-6 alkyl group, and more preferably a C1-4 alkyl group, or represent the C1-10 alkoxy group, preferably a C1-6 alkoxy group, and more preferably a C1-4 alkoxy group. When the carbon number falls within the above-mentioned ranges, the aromatic phosphoric acid ester can be obtained that is capable of imparting the excellent physical properties, such as the flame retardancy and the moldability, to the thermoplastic resin.

The C1-10 alkyl group may be linear or branched; and examples of the C1-10 alkyl group include a methyl group, an ethyl group, an n-propyl group, an isopropyl group, an n-butyl group, an isobutyl group, a tert-butyl group, an n-pentyl group, an isopentyl group, a 2-methylbutyl group, a 1-methylbutyl group, a 1,2-dimethylpropyl group, a neopentyl group (2,2-dimethylpropyl group), a tert-pentyl group (1,1-dimethylpropyl group), an n-hexyl group, an isohexyl group, a 1-methylpentyl group, a 2-methylpentyl group, a 3-methylpentyl group, a 1-ethylbutyl group, a 2-ethylbutyl group, a 1,1-dimethylbutyl group, a 1,2-dimethylbutyl group, a 1,3-dimethylbutyl group, a 2,2-dimethylbutyl group, a 2,3-dimethylbutyl group, a 1-ethyl-1-methylpropyl group, a 1-ethyl-2-methylpropyl group, an n-heptyl group, an isoheptyl group, a 1-methylhexyl group, a 2-methylhexyl group, a 3-methylhexyl group, a 4-methylhexyl group, a 1-ethylpentyl group, a 2-ethylpentyl group, a 3-ethylpentyl group, a 1-propylbutyl group, a 1,1-dimethylpentyl group, a 1,2-dimethylpentyl group, a 1,3-dimethylpentyl group, a 1,4-dimethylpentyl group, a 1-ethyl-1-methylbutyl group, a 1-ethyl-2-methylbutyl group, a 1-ethyl-3-methylbutyl group, a 2-ethyl-1-methylbutyl group, a 2-ethyl-2-methylbutyl group, a 2-ethyl-3-methylbutyl group, a 1,1-diethylpropyl group, an n-octyl group, an isooctyl group, a 1-methylheptyl group, a 2-methylheptyl group, a 3-methylheptyl group, a 4-methylheptyl group, a 5-methylheptyl group, a 1-ethylhexyl group, a 2-ethylhexyl group, a 3-ethylhexyl group, a 4-ethylhexyl group, a 1-propylheptyl group, a 2-propylheptyl group, a nonyl group, and a decyl group.

Of the above-listed alkyl groups, the following are preferable: the methyl group, the ethyl group, the n-propyl group, the isopropyl group, the n-butyl group, the isobutyl group, the tert-butyl group, the n-pentyl group, the isopentyl group, the 2-methylbutyl group, the 1-methylbutyl group, the 1,2-dimethylpropyl group, the neopentyl group (2,2-dimethylpropyl group), the tert-pentyl group (1,1-dimethylpropyl group), the n-hexyl group, the isohexyl group, the 1-methylpentyl group, the 2-methylpentyl group, the 3-methylpentyl group, the 1-ethylbutyl group, the 2-ethylbutyl group, the 1,1-dimethylbutyl group, the 1,2-dimethylbutyl group, the 1,3-dimethylbutyl group, the 2,2-dimethylbutyl group, the 2,3-dimethylbutyl group, the 1-ethyl-1-methylpropyl group, and the 1-ethyl-2-methylpropyl group; and the following are particularly preferable: the methyl group, the ethyl group, the n-propyl group, the isopropyl group, the n-butyl group, the isobutyl group, and the tert-butyl group.

The C1-10 alkoxyl group may be linear or branched; and examples of the C1-10 alkoxyl group include a methoxy group, an ethoxy group, an n-propoxy group, an isopropoxy group, an n-butoxy group, an isobutoxy group, a tert-butoxy group, an n-pentyloxy group, an isopentyloxy group, a 2-methylbutoxy group, a 1-methylbutoxy group, a 1,2-dimethylpropoxy group, a neopentyloxy group (2,2-dimethylpropoxy group), a tert-pentyloxy group (1,1-dimethylpropoxy group), an n-hexyloxy group, an isohexyloxy group, a 1-methylpentyloxy group, a 2-methylpentyloxy group, a 3-methylpentyloxy group, a 1-ethylbutoxy group, a 2-ethylbutoxy group, a 1,1-dimethylbutoxy group, a 1,2-dimethylbutoxy group, a 1,3-dimethylbutoxy group, a 2,2-dimethylbutoxy group, a 2,3-dimethylbutoxy group, a 1-ethyl-1-methylpropoxy group, a 1-ethyl-2-methylpropoxy group, an n-heptyloxy group, an isoheptyloxy group, a 1-methylhexyloxy group, a 2-methylhexyloxy group, a 3-methylhexyloxy group, a 4-methylhexyloxy group, a 1-ethylpentyloxy group, a 2-ethylpentyloxy group, a 3-ethylpentyloxy group, a 1-propylbutoxy group, a 1,1-dimethylpentyloxy group, a 1,2-dimethylpentyloxy group, a 1,3-dimethylpentyloxy group, a 1,4-dimethylpentyloxy group, a 1-ethyl-1-methylbutoxy group, a 1-ethyl-2-methylbutoxy group, a 1-ethyl-3-methylbutoxy group, a 2-ethyl-1-methylbutoxy group, a 2-ethyl-2-methylbutoxy group, a 2-ethyl-3-methylbutoxy group, a 1,1-diethylpropoxy group, an n-octyloxy group, an isooctyloxy group, a 1-methylheptyloxy group, a 2-methylheptyloxy group, a 3-methylheptyloxy group, a 4-methylheptyloxy group, a 5-methylheptyloxy group, a 1-ethylhexyloxy group, a 2-ethylhexyloxy group, a 3-ethylhexyloxy group, a 4-ethylhexyloxy group, a 1-propylheptyloxy group, a 2-propylheptyloxy group, a nonyloxy group, and a decyloxy group.

Of the above-listed alkoxy groups, the following are preferable: the methoxy group, the ethoxy group, the n-propoxy group, the isopropoxy group, the n-butoxy group, the isobutoxy group, the tert-butoxy group, the n-pentyloxy group, the isopentyloxy group, the 2-methylbutoxy group, the 1-methylbutoxy group, the 1,2-dimethylpropoxy group, the neopentyloxy group (2,2-dimethylpropoxy group), the tert-pentyloxy group (1,1-dimethylpropoxy group), the n-hexyloxy group, the isohexyloxy group, the 1-methylpentyloxy group, the 2-methylpentyloxy group, the 3-methylpentyloxy group, the 1-ethylbutoxy group, the 2-ethylbutoxy group, the 1,1-dimethylbutoxy group, the 1,2-dimethylbutoxy group, the 1,3-dimethylbutoxy group, the 2,2-dimethylbutoxy group, the 2,3-dimethylbutoxy group, the 1-ethyl-1-methylpropoxy group, and the 1-ethyl-2-methylpropoxy group; and the following are particularly preferable: the methoxy group, the ethoxy group, the n-propoxy group, the isopropoxy group, the n-butoxy group, the isobutoxy group, and the tert-butoxy group.

Two types of the groups from among the alkyl groups and the alkoxy groups may be present in a single molecule; or only one type of the group from among the alkyl groups and the alkoxy groups may be present; however, it is particularly preferable that only the alkyl group should be present.

Indexes in the general formula (I) are as follows.

n represents an integer of 1 to 10, preferably 1 to 5, more preferably 1 to 3, and further preferably 1.

$n^1$ and $n^2$ each independently represent an integer of 0 to 3, preferably 0 to 1, and more preferably 0.

$m^1$ and $m^2$ each independently represent an integer of 0 to 4, preferably 0 to 2, and more preferably 0.

p represents an integer of 0 to 26, preferably 0 to 22, more preferably 0 to 10, further preferably 0 to 5, and particularly preferably 0 to 3.

k represents an integer of 1 to 12, preferably 3 to 10, and more preferably 4 or 10.

When the aromatic phosphoric acid ester has the indexes falling within the above-mentioned ranges, the thermoplastic resin composition to which the aromatic phosphoric acid ester is added achieves the highly-balanced physical properties, such as the flame retardancy, the heat flowability, the heat resistance, and the bleed resistance.

The definition "when p is 2 or more, any two substituents $R^9$ may be bonded to each other, and may be bonded to a carbon atom(s) of a ring to which the above substituents $R^9$ are bonded, forming another ring" regarding the general formula (I) means that a structure such as the one shown below may be formed:

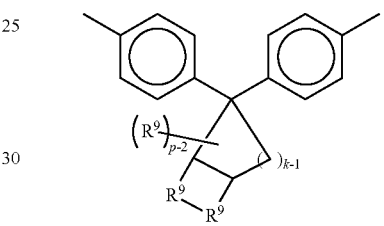

wherein $R^9$, p, and k are as defined in the general formula (I).

As a specific example there may be mentioned a structure represented by the following formula:

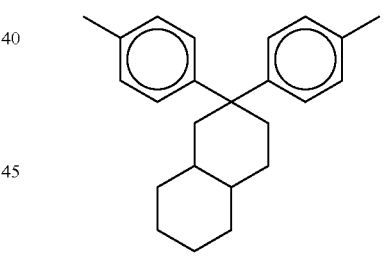

It is desirable that the aromatic phosphoric acid ester to be contained in the flame retardant of the present invention should comprise main components whose indexes fall within the above-mentioned ranges; however, the aromatic phosphoric acid ester may be a mixture of the components whose indexes are different. The aromatic phosphoric acid ester may contain the components whose indexes fall outside the above-mentioned ranges, as long as the components do not hinder the advantageous effects of the present invention.

As desirable examples of the aromatic phosphoric acid ester of the present invention there may be mentioned as follows:

a compound represented by the following general formula (II) derived from the general formula (I) wherein n represents 1, p represents an integer of 0 to 10, and k represents 4:

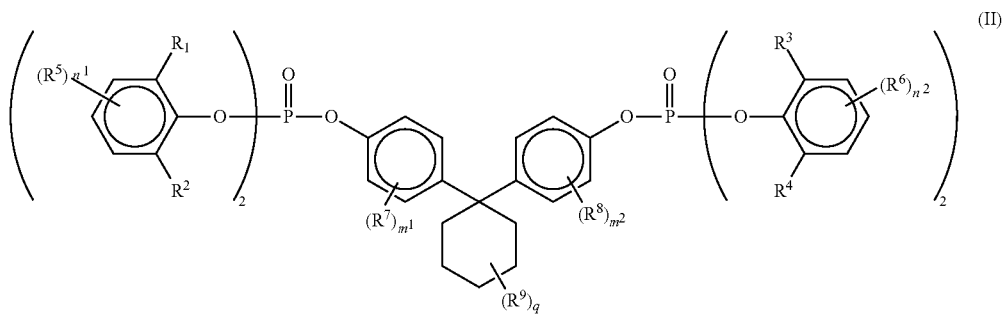

wherein $R^1$ to $R^9$, $n^1$, $n^2$, $m^1$, and $m^2$ are as defined in the general formula (I); and q represents an integer of 0 to 10, preferably 0 to 5, and more preferably 0 to 3; and a compound represented by the following general formula (III) derived from the general formula (I) wherein n represents 1, p represents an integer of 0 to 22, and k represents 10:

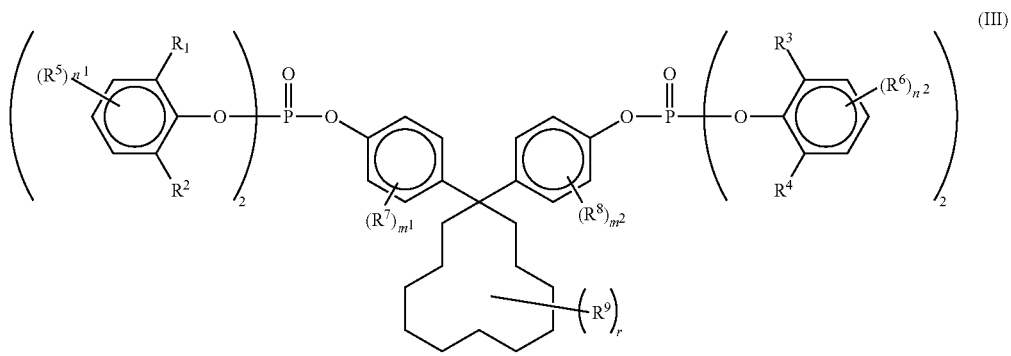

wherein $R^1$ to $R^9$, $n^1$, $n^2$, $m^1$, and $m^2$ are as defined in the general formula (I); and r represents an integer of 0 to 22, preferably 0 to 10, more preferably 0 to 5, particularly preferably 0 to 3, and most preferably 0.

As specific examples of the aromatic phosphoric acid ester of the present invention there may be mentioned aromatic phosphoric acid esters 1 to 4 having the following structural formulas; and any compound selected from these compounds can be suitably used for the present invention.

Aromatic Phosphoric Acid Ester 1:

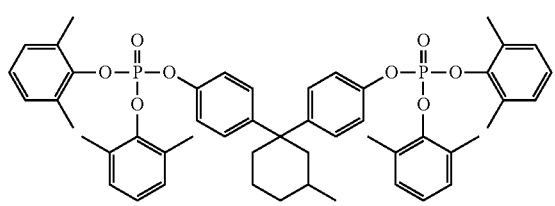 [SMILES: Cc1cccc(C)c1OP(=O)(Oc1ccc(C2(c3ccc(OP(=O)(Oc4c(C)cccc4C)Oc4c(C)cccc4C)cc3)CCCC(C)C2)cc1)Oc1c(C)cccc1C]

Aromatic Phosphoric Acid Ester 2:

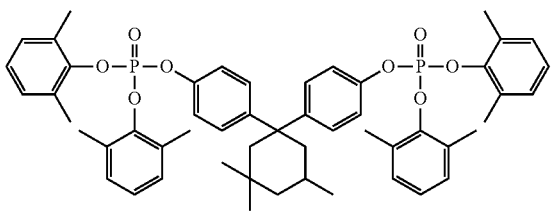 [SMILES: Cc1cccc(C)c1OP(=O)(Oc1ccc(C2(c3ccc(OP(=O)(Oc4c(C)cccc4C)Oc4c(C)cccc4C)cc3)CC(C)CC(C)(C)C2)cc1)Oc1c(C)cccc1C]

Aromatic Phosphoric Acid Ester 3:

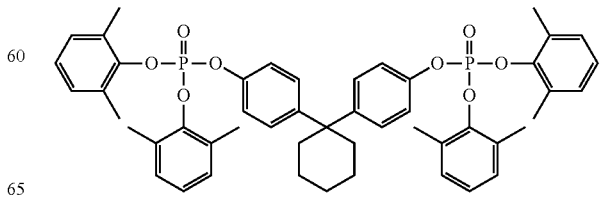

Aromatic Phosphoric Acid Ester 4:

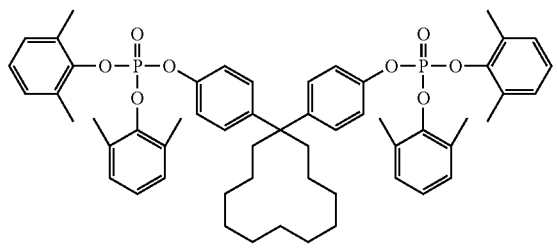 [SMILES: Cc1cccc(C)c1OP(=O)(Oc1ccc(C2(c3ccc(OP(=O)(Oc4c(C)cccc4C)Oc4c(C)cccc4C)cc3)CCCCCCCCCCC2)cc1)Oc1c(C)cccc1C]

2. Method for Synthesizing Aromatic Phosphoric Acid Esters

The flame retardant of the present invention is synthesized by a commonly-known method with use of corresponding phenols, bisphenols, and phosphorus oxychloride as materials.

For example, an intended aromatic phosphoric acid ester may be obtained as follows:
a phenol represented by the general formula (IV):

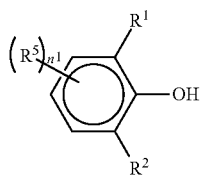

(IV)

wherein $R^1$, $R^2$, $R^5$, and $n^1$ are as defined in the general formula (I) and phosphorus oxychloride are subjected to a dehydrochlorination reaction in the presence of a Lewis acid catalyst, such as aluminum chloride or magnesium chloride, obtaining a diester compound represented by the general formula (V):

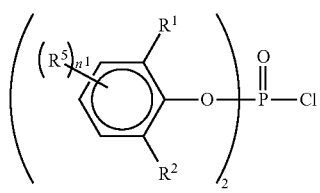

(V)

wherein $R^1$, $R^2$, $R^5$, and $n^1$ are as defined in the general formula (I); and the diester compound thereby obtained and a bisphenol compound represented by the general formula (VI):

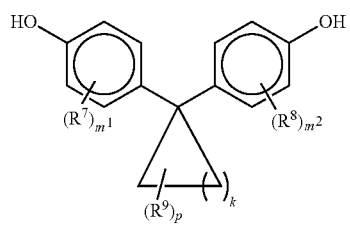

(VI)

wherein $R^7$, $R^8$, $R^9$, $m^1$, $m^2$, p, and k are as defined in the general formula (I)
are subjected to a dehydrochlorination reaction in the presence of a Lewis acid catalyst or to an esterification reaction using a hydrogen chloride scavenger, such as pyridine, triethylamine, or tributylamine, obtaining an intended aromatic phosphoric acid ester; or the bisphenol represented by the general formula (VI) and phosphorus oxychloride are subjected to a dehydrochlorination reaction in the presence of a Lewis acid catalyst or to an esterification reaction using a hydrogen chloride scavenger, such as pyridine, triethylamine, or tributylamine, obtaining a phosphorus compound represented by the general formula (VII):

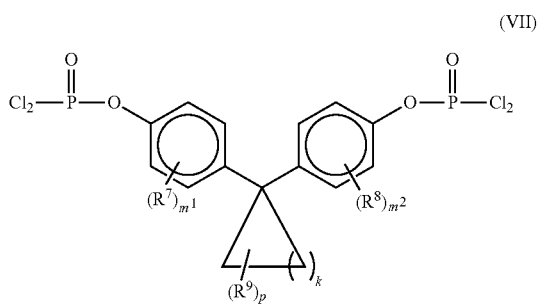

(VII)

wherein $R^7$, $R^8$, $R^9$, $m^1$, $m^2$, p, and k are as defined in the general formula (I); and the phosphorus compound thereby obtained and the phenol represented by the above-mentioned general formula (IV) are subjected to a dehydrochlorination reaction in the presence of a Lewis acid catalyst or to an esterification reaction using a hydrogen chloride scavenger, such as pyridine, triethylamine, or tributylamine, obtaining an intended aromatic phosphoric acid ester.

3. Thermoplastic Resin Composition

The thermoplastic resin composition of the present invention is characterized by containing the above-described flame retardant and thermoplastic resin.

Thermoplastic Resin

The thermoplastic resin is not particularly limited, as long as the resin has thermoplasticity; and examples of the thermoplastic resin include polyolefin resins such as polyethylene and polypropylene; polyolefin copolymers such as an ethylene-vinyl acetate copolymer or its saponifiable substance and an ethylene-(meth)acrylic acid (ester) copolymer; polyester resins such as polyethylene terephthalate (PET) and polybutylene terephthalate (PBT); acrylic resins such as polymethylmethacrylate; polyamide resins such as 6-nylon, 6,6-nylon, and 6,10-nylon; styrene resins such as polystyrene, an AS resin, and an ABS resin; chlorinated resins such as polyvinyl chloride and polyvinylidene chloride; polycarbonate resins (PC); and polyphenylene ether; and these compounds can be used independently or in combination of two or more kinds thereof.

Of the above-listed thermoplastic resins, in order for the thermoplastic resin composition of the present invention to fully demonstrate its functions, there may be mentioned the polycarbonate resins, alloys containing the styrene resin in addition to the polycarbonate resin (for example, PC/ABS resin), and the polyester resins. Of the polyester resins, the polybutylene terephthalate in particular as the resin composition containing the flame retardant of the present invention achieves excellence especially in bleed resistance.

Blending Ratio

It is generally desirable that the flame retardant of the present invention should be contained in an amount of 1 to 50 parts by mass with respect to 100 parts by mass of the thermoplastic resin.

In a case where the amount of the flame retardant falls within the above-mentioned range, the thermoplastic resin composition can be obtained having excellent flame retardancy, heat flowability, heat resistance, hydrolysis resistance, and bleed resistance.

In a case where the amount of the flame retardant is lower than 1 part by mass, the flame retardant cannot fully impart the features, such as the flame retardancy, to the resin, which is not desired. The amount of the flame retardant exceeding 50 parts by mass is also undesired because the flame retardant may possible cause a decrease in physical properties of the resin itself, especially mechanical properties.

The amount of the flame retardant is more preferably 5 to 40 parts by mass and particularly preferably 10 to 30 parts by mass.

The specific amounts (parts by mass) of the flame retardant with respect to 100 parts by mass of the thermoplastic resin are, for example, 1, 5, 8, 10, 11, 12, 13, 14, 15, 16, 17, 18, 19, 20, 21, 22, 23, 24, 25, 26, 27, 28, 29, 30, 32, 35, 40, 45, and 50.

Other Components

If necessary, the thermoplastic resin composition of the present invention may contain additional components, which are usually added to resins, as long as the advantageous effects of the present invention are not lessened. As examples of the additional components there may be mentioned other flame retardants, anti-drip agents, antioxidizing agents, fillers, lubricants, modifying agents, fragrances, antimicrobial agents, pigments, dyes, antistatic agents, ultraviolet absorbers, stabilizers, toughening agents, anti-blocking agents, wood flour, and starches.

4. Method for Preparing Thermoplastic Resin Composition

The thermoplastic resin composition of the present invention is obtained by adding to the thermoplastic resin the flame retardant and the other components as needed. How to add the flame retardant and the other components to the thermoplastic resin is not particularly limited; and an example of the addition method is a commonly-known method in which the components are melted and kneaded with a commonly-used kneading apparatus such as a single-screw extruder, a twin-screw extruder, a Bumbury mixer, or a kneader.

EXAMPLES

The present invention will be described in detail by way of Synthesis Examples and Test Examples (Examples and Comparative Examples) below; however, the scope of the present invention is not limited to these Examples in Test Examples.

[Identification of Aromatic Phosphoric Acid Esters]

Aromatic phosphoric acid esters obtained by Synthesis Examples were identified with use of the following measuring device ($^1$H-NMR) and under the following condition.

Measuring device: $^1$H-NMR (model: JNM-ECS-400) manufactured by JEOL Ltd.

Solvent: $CDCl_3$

[Evaluation of Aromatic Phosphoric Acid Esters]

The aromatic phosphoric acid esters obtained by Synthesis Examples and well-known aromatic phosphoric acid esters used in Comparative Examples were evaluated by the following method.

(Hydrolysis Resistance)

The aromatic phosphoric acid esters were evaluated for hydrolysis resistance in view of degradation rates (%) obtained by a hydrolysis test (pressure cooker test).

A 100-ml capacity glass bottle (whose opening is 40 mm in diameter) was filled with 30 g of an aromatic phosphoric acid ester as a sample; and the sample was treated using a pressure cooker for 96 hours in an environment of a temperature of 121° C. and a relative humidity of 100%; and then an increased amount of a total acid content in the sample was measured by a neutralization titration.

Assuming that a total acid content was 100% when the sample was completely hydrolyzed, a ratio of hydrolysis (rate of hydrolysis) during the treatment was calculated from the increased amount of the total acid content by the following formula:

Degradation rate (%)=[increased amount of total acid content (KOH mg)/theoretical total acid content after complete degradation (KOH mg)]×100

Increased amount of total acid content (KOH mg)=total acid content after treatment−total acid content before treatment Total acid content after complete degradation (KOH mg)=sample (g)×$P$%/100/31×56,100×3

[Evaluation of Thermoplastic Resin Compositions]

Thermoplastic resin compositions obtained by Examples and Comparative Examples were evaluated by the following method using the following measuring device and under the following conditions.

(Flame Retardancy)

Test method: according to UL94 standards (20-mm vertical burning test)

Test piece: ⅛ inch (3.2 mm) in thickness

Measuring device: UL94 flammability tester (model: UL94Z) manufactured by Suga Test Instruments Co., Ltd.

Evaluation standards: ranks V-0, V-1, and V-2 according to regulations (Heat Resistance)

Test method: according to D-648 of ASTM standards

Test piece: 6.4 mm in thickness

Measuring device: Heat Deflection Tester (HDT) (model: 3M-2) manufactured by Toyo Seiki Seisaku-Sho, Ltd.

Measurement condition: load of 1.8 MPa

Evaluation standards: deflection temperature under load (HDT; unit: ° C.)

(Heat Flowability)

Test method: according to K-7210 of JIS standards

Measuring device: melt indexer (model: L225-42) manufactured by Tateyama Kagaku Industry Co., Ltd.

Measurement conditions: temperature of 230° C., load of 5 kg

Evaluation standards: melt flow rate (MFR; unit: g/10 min)

(Bleed Resistance)

A strip-shaped test piece of size 127 mm×12.7 mm×1.8 mm was left in a dryer (model: DRM420DB, manufactured by Advantec Toyo Kaisha, Ltd.) set to 80° C. for 7 days; then an aromatic phosphoric acid ester bled on a surface of the test piece was wiped with a solvent (toluene and methanol); and then a percentage of decrease (%) caused by the bleeding was calculated from a mass difference of the test piece before and after the wiping.

[Materials for Synthesizing Aromatic Phosphoric Acid Esters]

The following compounds were used as materials in Synthesis Examples:

2,6-xylenol (manufactured by Tokyo Chemical Industry Co., Ltd.)

Phosphorus oxychloride (manufactured by Tokyo Chemical Industry Co., Ltd.)

Bisphenol 1

3-methyl-1,1-bis(4-hydroxyphenyl)cyclohexane (product name: BisP-3MZ, manufactured by Honshu Chemical Industry Co., Ltd. and represented by the following structural formula)

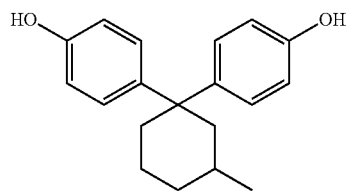 [SMILES: CC1CCCC(c2ccc(O)cc2)(c2ccc(O)cc2)C1]

Bisphenol 2

3,3,5-trimethyl-1,1-bis(4-hydroxyphenyl)cyclohexane (product name: BisP-TMC, manufactured by Honshu Chemical Industry Co., Ltd. and represented by the following structural formula)

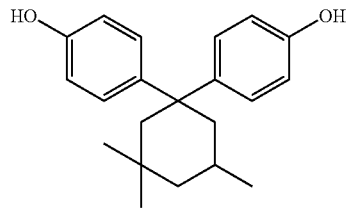 [SMILES: CC1CC(C)(C)CC(c2ccc(O)cc2)(c2ccc(O)cc2)C1]

Bisphenol 3

1,1-bis(4-hydroxyphenyl)cyclohexane (product name: Bis-Z, manufactured by Honshu Chemical Industry Co., Ltd. and represented by the following structural formula)

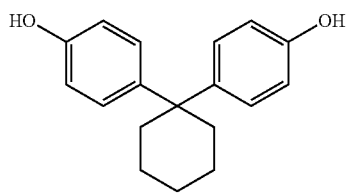 [SMILES: Oc1ccc(C2(c3ccc(O)cc3)CCCCC2)cc1]

Bisphenol 4

1,1-bis(4-hydroxyphenyl)cyclododecane (product name: BisP-CDE, manufactured by Honshu Chemical Industry Co., Ltd. and represented by the following structural formula)

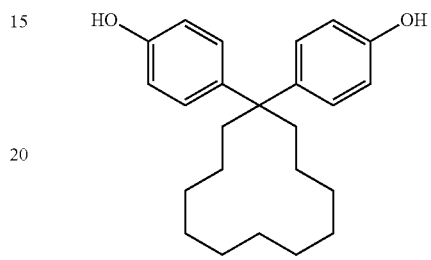

Diphenylphosphorochloridate (DPC, manufactured by Daihachi Chemical Industry Co., Ltd.)

[Materials of Thermoplastic Resin Compositions]

The following compounds were used as materials in Test Examples:

PC/ABS resin (product name: Novalloy S1500, manufactured by Daicel Polymer Ltd.)

PBT resin (product name: Duranex 2002, manufactured by Polyplastics Co., Ltd.)

Flame retardant additive (polytetrafluoroethylene (PTFE); product name: PTFE Fine Powder 6-J, manufactured by Dupont-Mitsui Fluorochemical Co., Ltd.)

Aromatic phosphoric acid ester 7 (used in Comparative Examples 3 and 4, represented by the following structural formula, and synthesized by a method described in Japanese Unexamined Patent Application Publication No. 2000-38397 and Japanese Unexamined Patent Application Publication No. 2000-63391)

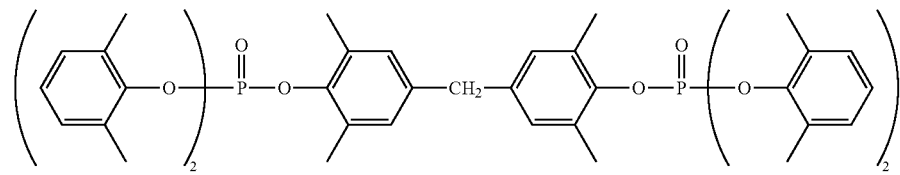

Aromatic phosphoric acid ester 8 (used in Comparative Examples 5, 6, and 10, represented by the following structural formula, and synthesized by a method described in Japanese Unexamined Patent Application Publication No. H05(1993)-1079:

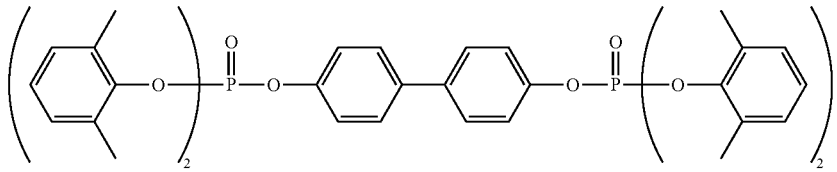

Aromatic phosphoric acid ester 9 (used in Comparative Examples 7 and 11, represented by the following structural formula, and manufactured by Daihachi Chemical Industry Co., Ltd. as product name: PX-200):

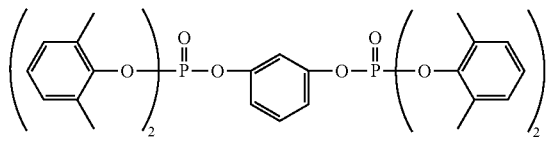

Aromatic phosphoric acid ester 10 (used in Comparative Example 8, represented by the following structural formula, and manufactured by Daihachi Chemical Industry Co., Ltd. as product name: CR-741):

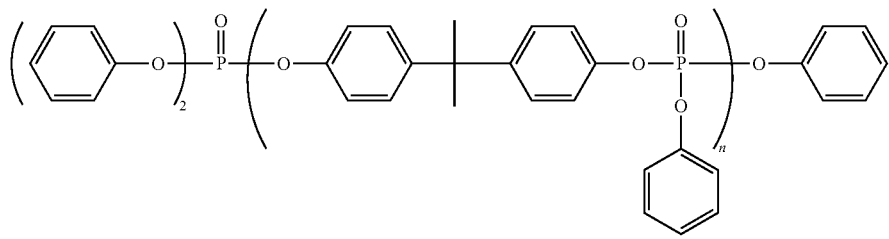

Synthesis of Aromatic Phosphoric Acid Esters

Synthesis Example 1: Synthesis of Dixylylphosphorochloridate (DXPC)

A 2-liter capacity four-necked flask equipped with a stirrer, a thermometer, and a hydrochloric acid collecting device (condenser connected with a water scrubber) was filled with 767 g of phosphorus oxychloride, 1,200 g of 2,6-xylenol, 140 g of xylene as a solvent, and 6.2 g of magnesium chloride as a catalyst.

The resulting mixed solution was gradually heated to a temperature of 160° C. over about 3 hours while stirred and was allowed for a reaction, and hydrogen chloride (hydrochloric acid gas) produced from the reaction was collected with the water scrubber. Thereafter, a pressure in the flask was gradually reduced to 20 kPa at the same temperature (160° C.); and xylene, unreacted phosphorus oxychloride and 2,6-xylenol, and hydrogen chloride as a byproduct were removed, obtaining 1,700 g of the reaction mixture mainly containing dixylylphosphorochloridate represented by the following structural formula. A content rate of chlorine in the reaction mixture was 10.9% by mass.

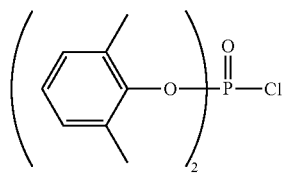

Synthesis Example 2: Synthesis of Aromatic Phosphoric Acid Ester 1

A two-liter capacity four-necked flask equipped with a stirrer, a thermometer, a dropping funnel, and a condenser was filled with 460 g of the dixylylphosphorochloridate obtained in Synthesis Example 1, 178 g of bisphenol 1, 540 g of toluene as a solvent, and 140 g of tetrahydrofuran. The dropping funnel was filled with 151 g of triethylamine as a hydrogen halide scavenger.

The mixed solution in the four-necked flask was heated to a temperature of 65° C. while stirred; and the triethylamine in the dropping funnel was dropped into the mixed solution over 1 hour and 30 minutes while the same temperature (65° C.) was maintained. After the dropping was completed, the resulting mixed solution was stirred for 2 hours at the same temperature (65° C.), obtaining a reaction product.

The reaction product thereby obtained was washed with dilute hydrochloric acid and water, and was neutralized and washed with a sodium hydroxide aqueous solution, and then was washed again with water. Then, the reaction product was heated to a temperature of 110° C.; and the pressure was reduced to 1 kPa, collecting water, toluene, and tetrahydrofuran. Further, under the reduced pressure of 1 kPa, the reaction product was subjected to steam distillation at a temperature of 110° C., thereby removing low boiling components; and the reaction product was cooled to room temperature, thereby obtaining 538 g of a pale yellow transparent glassy solid.

Figure 2:
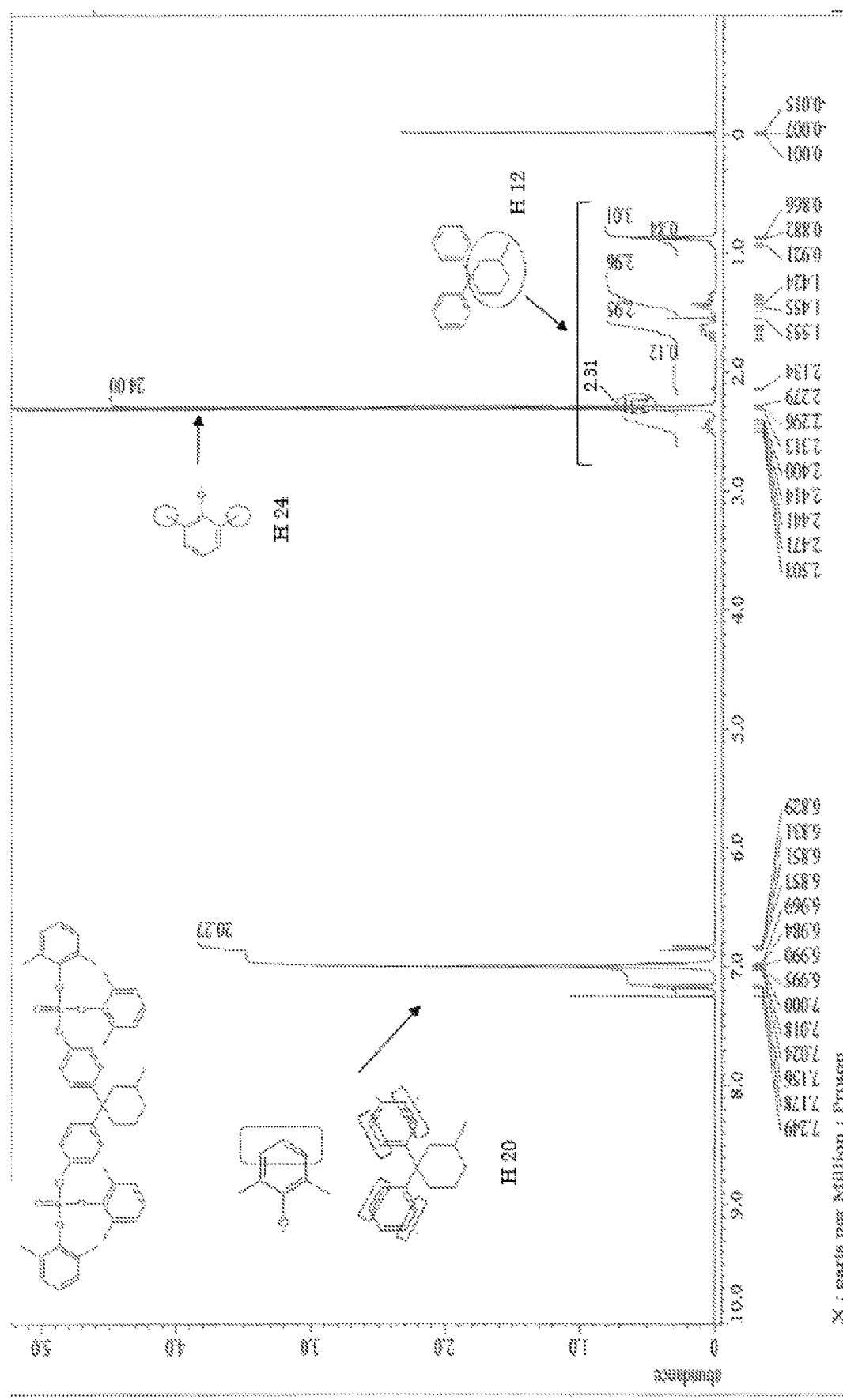
FIG. 2 shows a $^1$H-NMR chart of aromatic phosphoric acid ester 1 of Synthesis Example 2.

It was confirmed by $^1$H-NMR that the product thereby obtained contained, as a main component, aromatic phosphoric acid ester 1 represented by the following structural formula. A $^1$H-NMR chart is shown in FIG. 2.

The term "H number" in FIG. 2 and in FIGS. 3 and 6 to 8 to be shown below indicates the number of hydrogen atoms. For example, "H 20" represents twenty (20) hydrogen atoms.

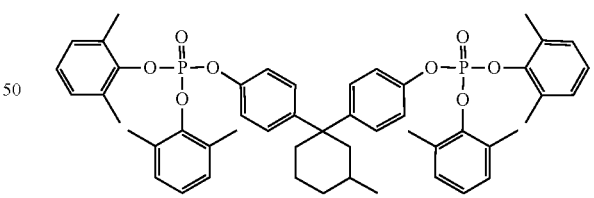

Synthesis Example 3: Synthesis of Aromatic Phosphoric Acid Ester 2

553 g of a pale yellow transparent glassy solid was obtained in the same manner as in Synthesis Example 2, except that 196 g of bisphenol 2 was used instead of bisphenol 1.

Figure 3:
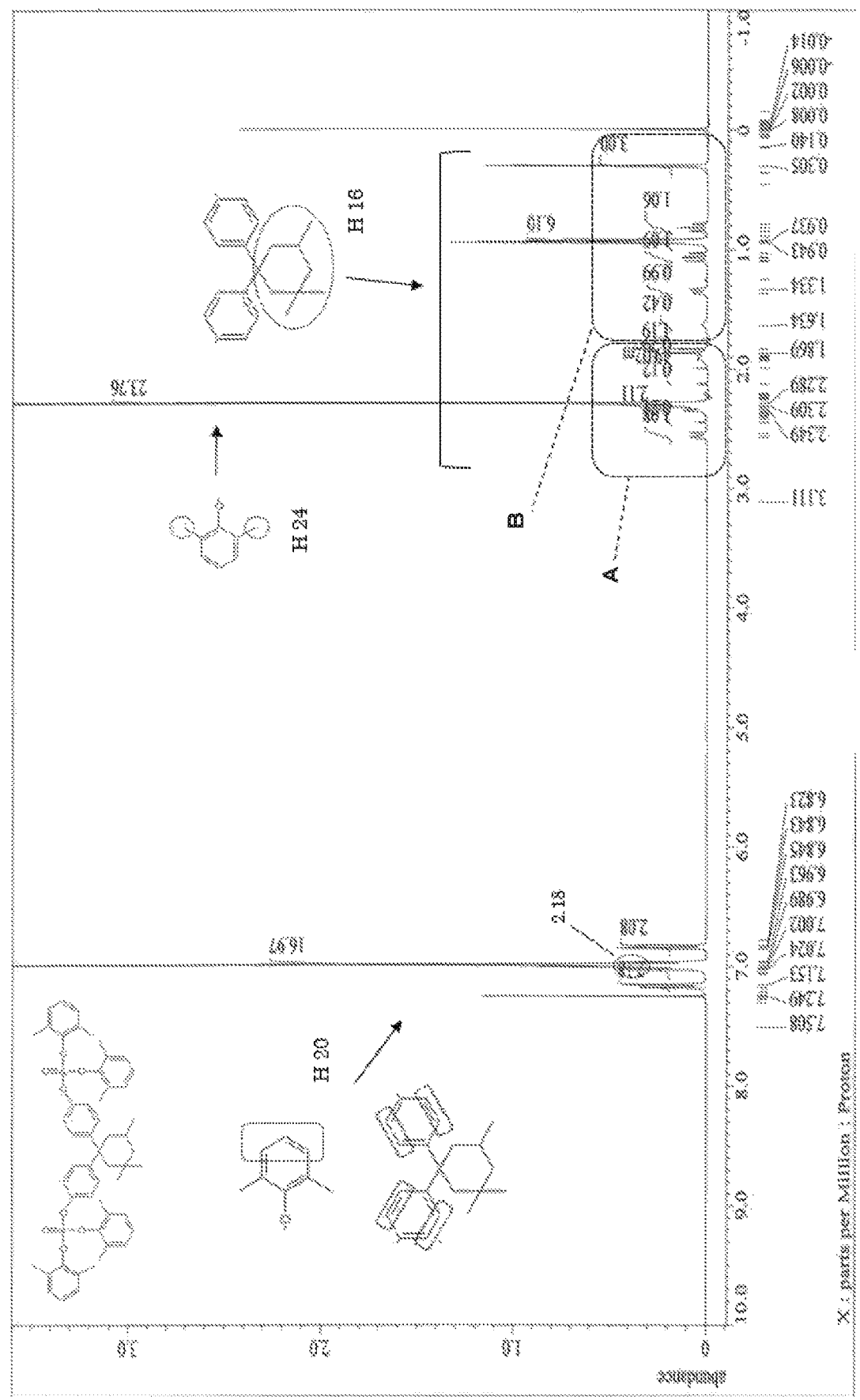
FIG. 3 shows a $^1$H-NMR chart of aromatic phosphoric acid ester 2 of Synthesis Example 3.
Figure 4:
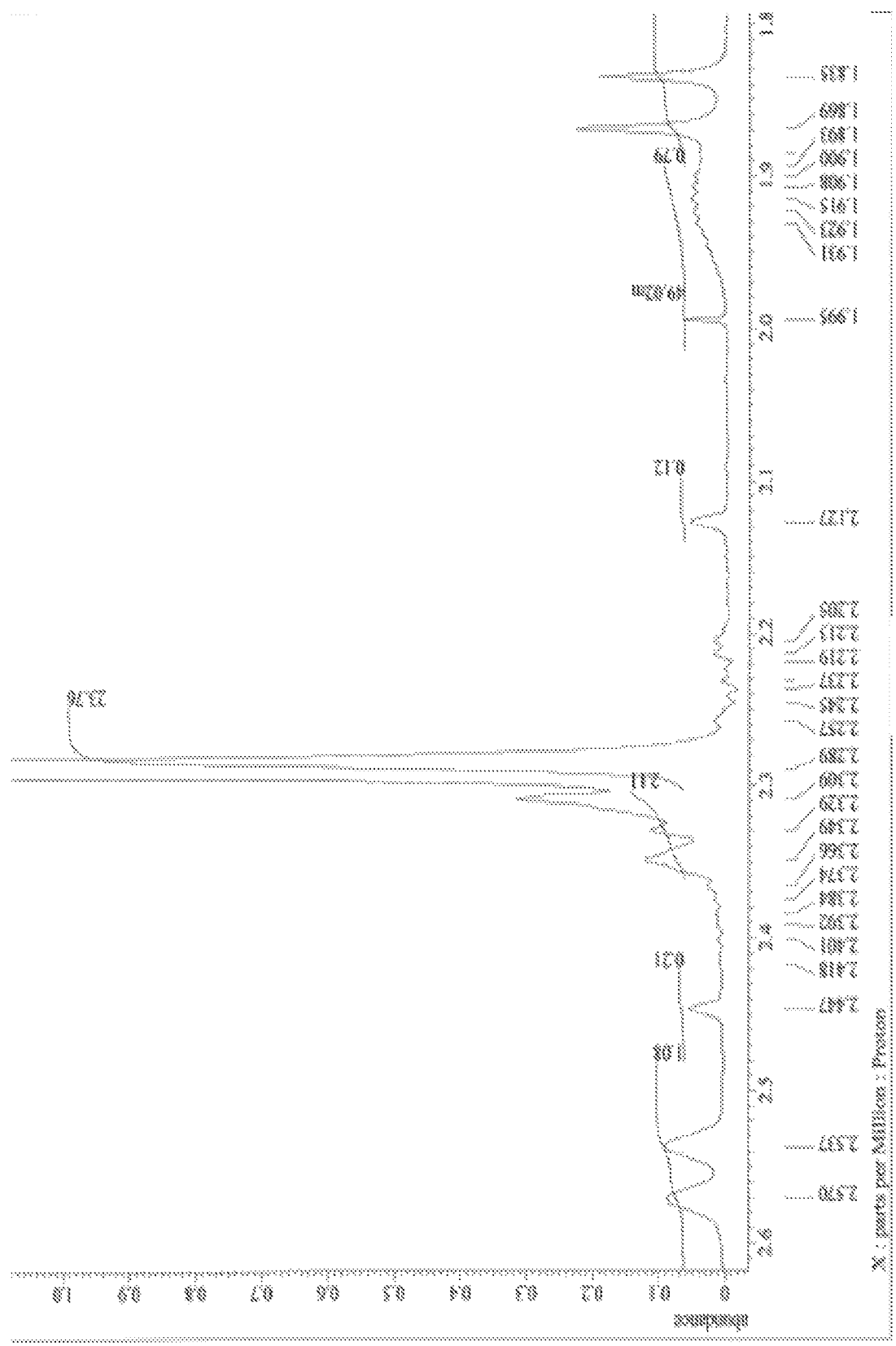
FIG. 4 shows an enlarged view of a region A of FIG. 3.
Figure 5:
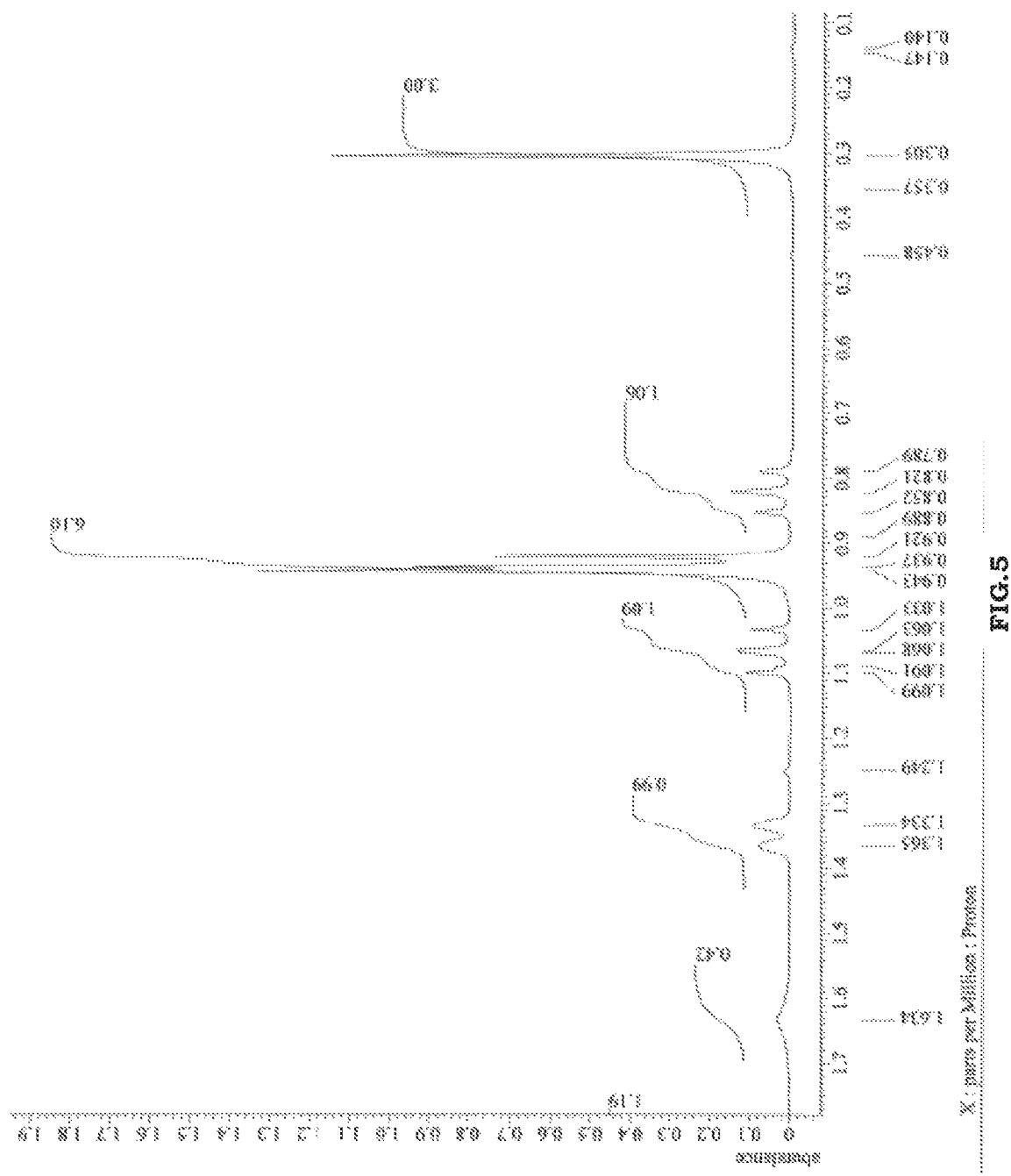
FIG. 5 shows an enlarged view of a region B of FIG. 3.

It was confirmed by $^1$H-NMR that the product thereby obtained contained, as a main component, aromatic phosphoric acid ester 2 represented by the following structural formula. $^1$H-NMR charts are shown in FIGS. 3 to 5.

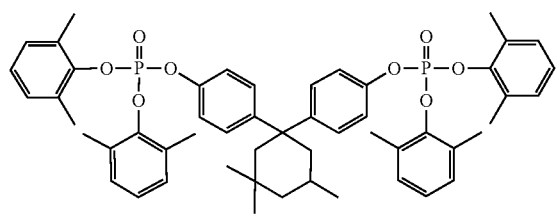

Synthesis Example 4: Synthesis of Aromatic Phosphoric Acid Ester 4

569 g of a pale yellow transparent glassy solid was obtained in the same manner as in Synthesis Example 2, except that 216 g of bisphenol 4 was used instead of bisphenol 1.

Figure 6:
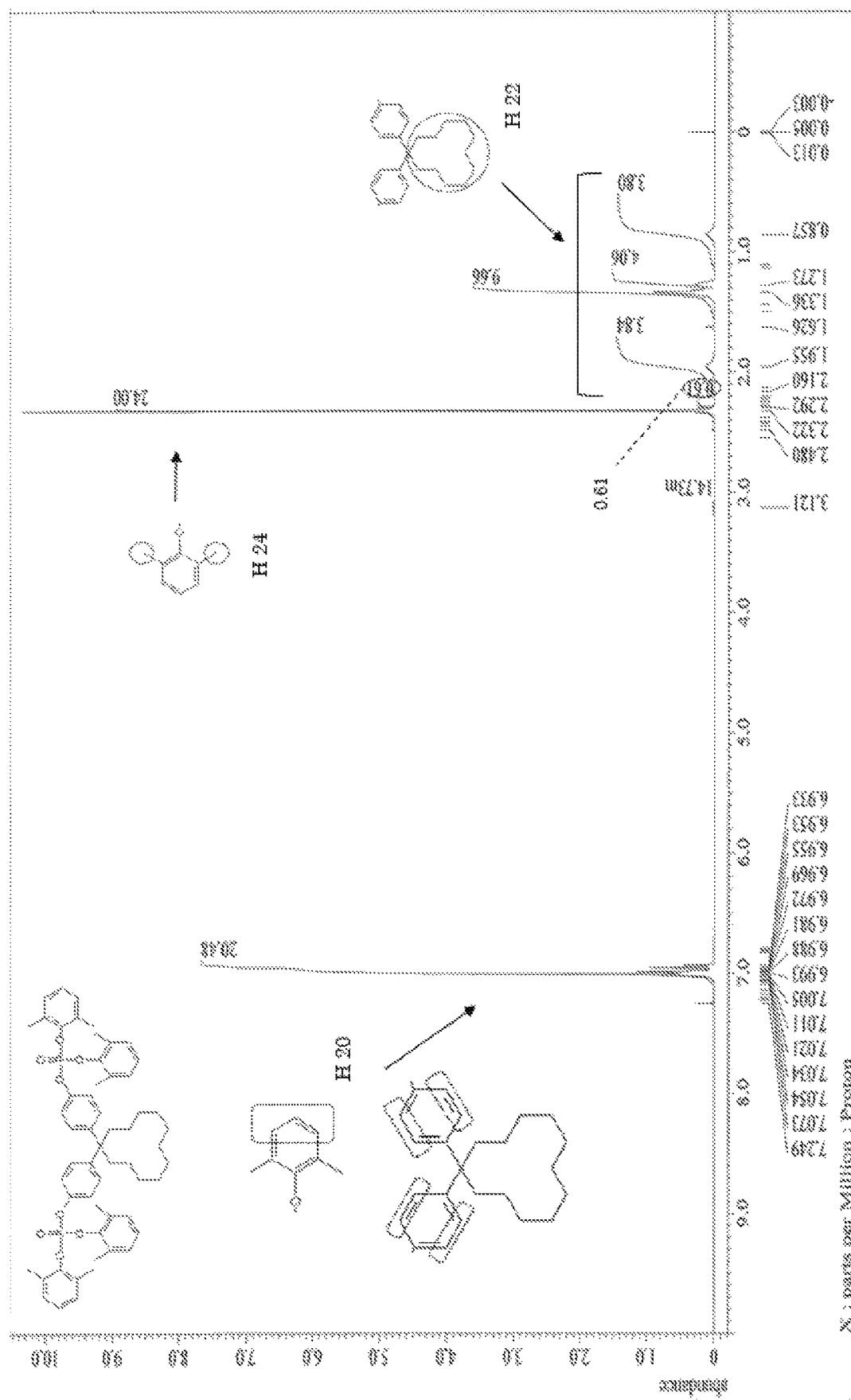
FIG. 6 shows a $^1$H-NMR chart of aromatic phosphoric acid ester 4 of Synthesis Example 4.

It was confirmed by $^1$H-NMR that the product thereby obtained contained, as a main component, aromatic phosphoric acid ester 4 represented by the following structural formula. A $^1$H-NMR chart is shown in FIG. 6.

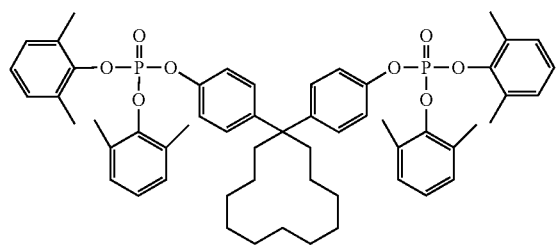

Synthesis Example 5: Synthesis of Aromatic Phosphoric Acid Ester 5

431 g of white powder was obtained in the same manner as in Synthesis Example 2, except that 355 g of diphenylphosphorochloridate was used instead of dixylylphosphorochloridate, and 169 g of bisphenol 3 was used instead of bisphenol 1.

Figure 7:
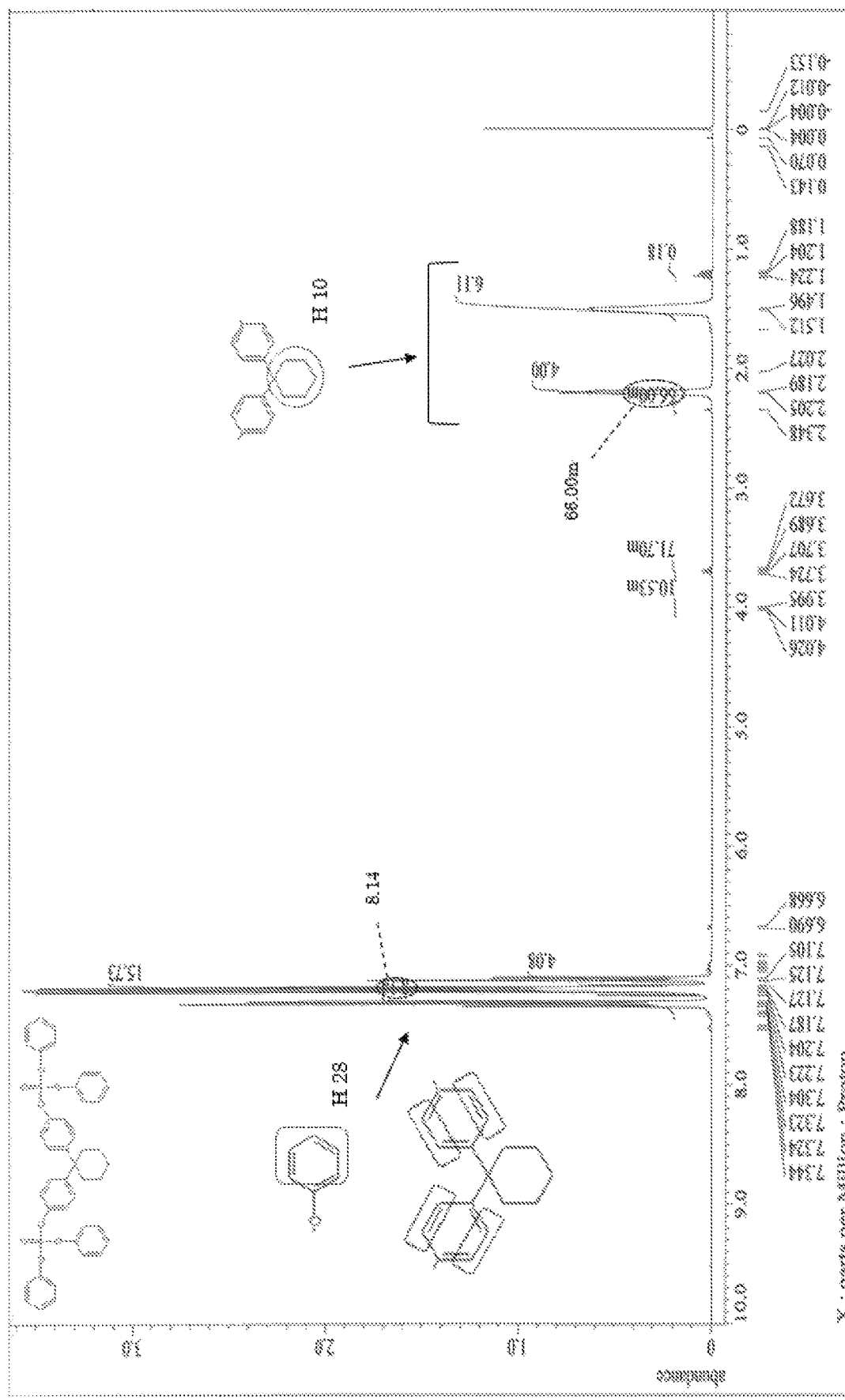
FIG. 7 shows a $^1$H-NMR chart of aromatic phosphoric acid ester 5 of Synthesis Example 5.

It was confirmed by $^1$H-NMR that the product thereby obtained contained, as a main component, aromatic phosphoric acid ester 5 represented by the following structural formula. A $^1$H-NMR chart is shown in FIG. 7.

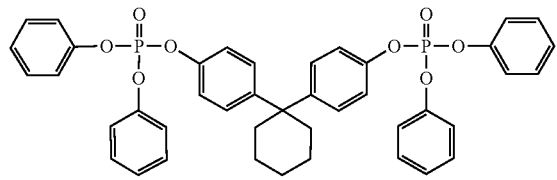

Synthesis Example 6: Synthesis of Aromatic Phosphoric Acid Ester 6

455 g of high-viscosity colorless transparent liquid was obtained in the same manner as in Synthesis Example 2, except that 355 g of diphenylphosphorochloridate was used instead of dixylylphosphorochloridate, and 196 g of bisphenol 2 was used instead of bisphenol 1.

Figure 8:
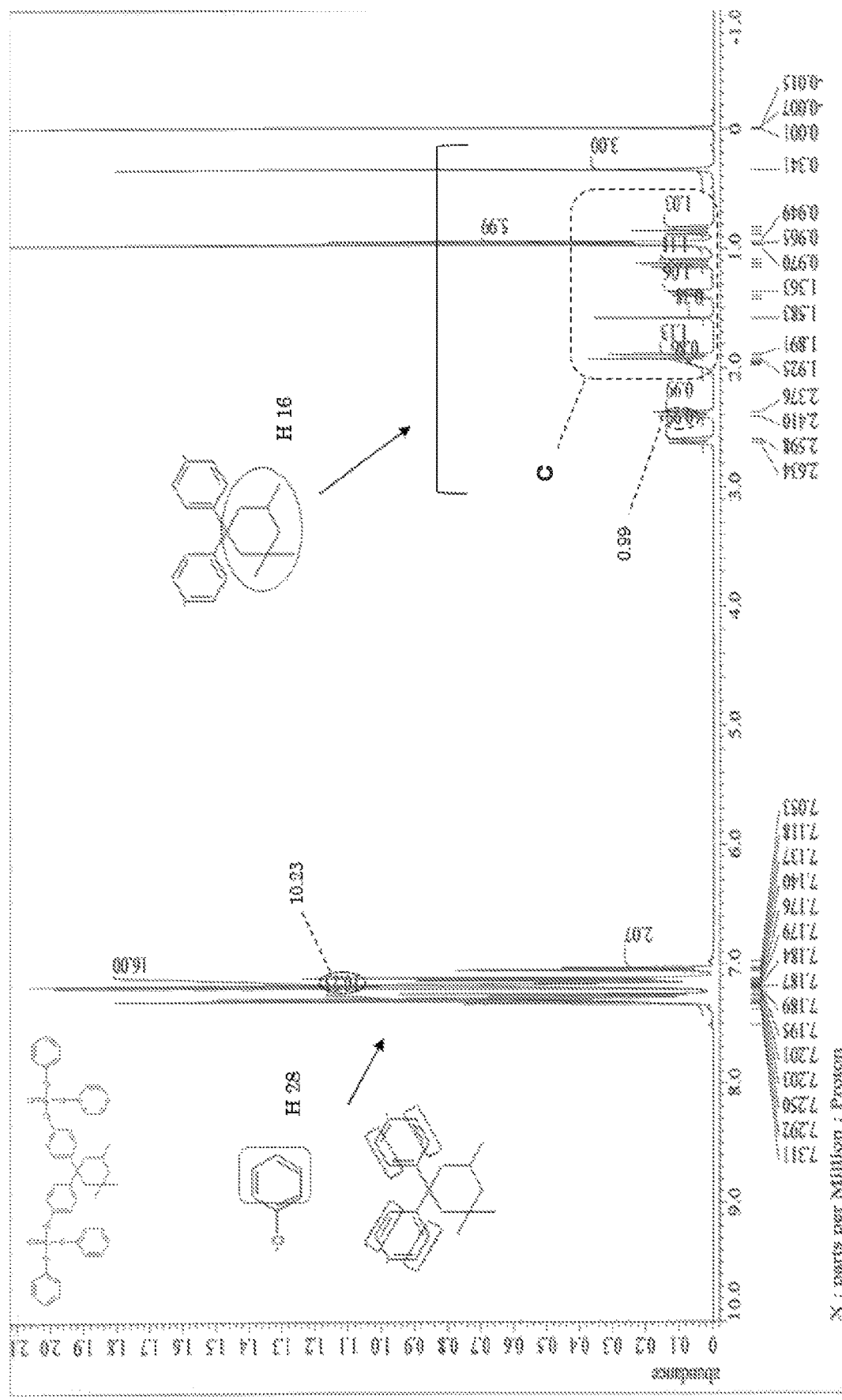
FIG. 8 shows a $^1$H-NMR chart of aromatic phosphoric acid ester 6 of Synthesis Example 6.
Figure 9:
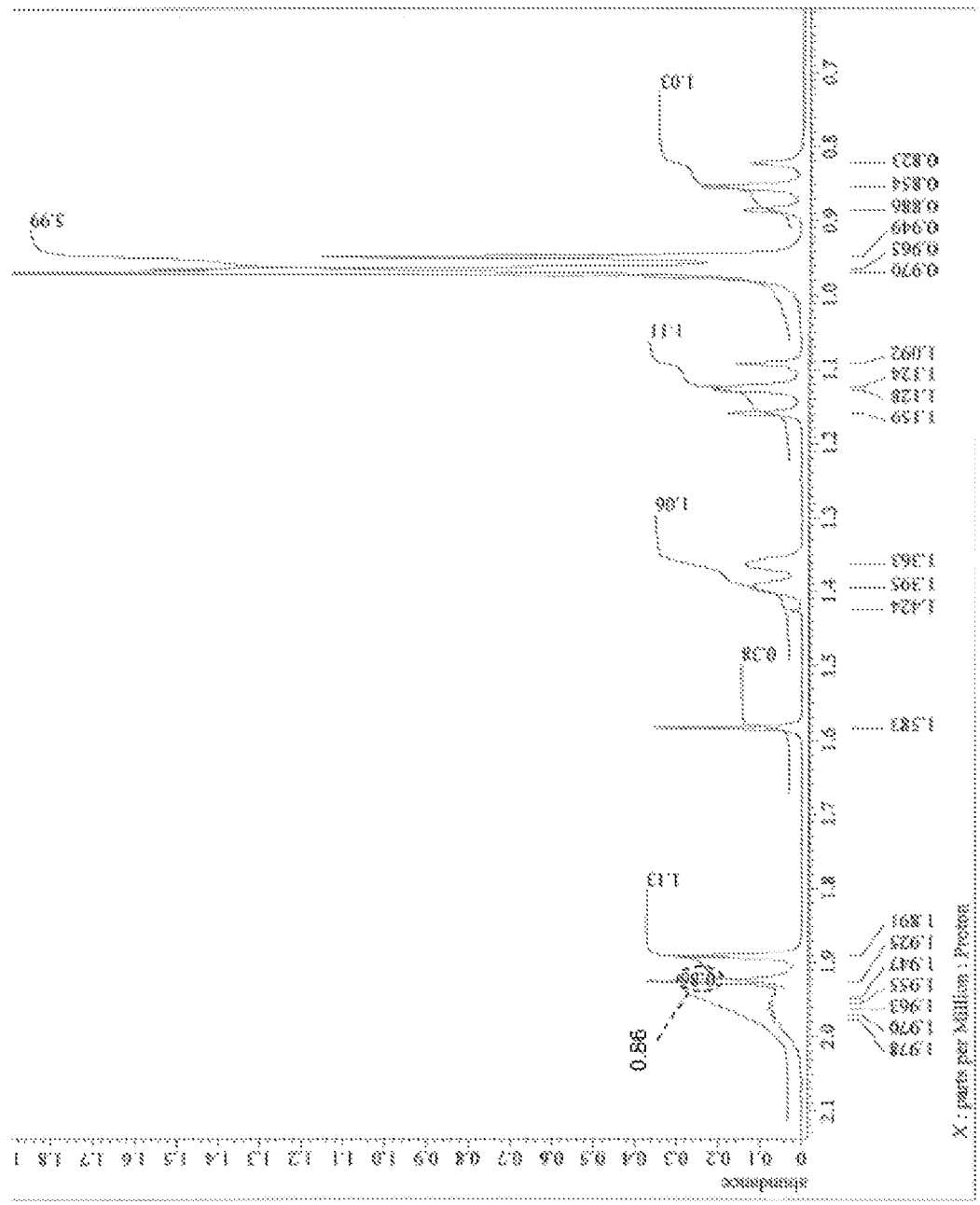
FIG. 9 shows an enlarged view of a region C of FIG. 8.

It was confirmed by $^1$H-NMR that the product thereby obtained contained, as a main component, aromatic phosphoric acid ester 6 represented by the following structural formula. $^1$H-NMR charts are shown in FIGS. 8 and 9.

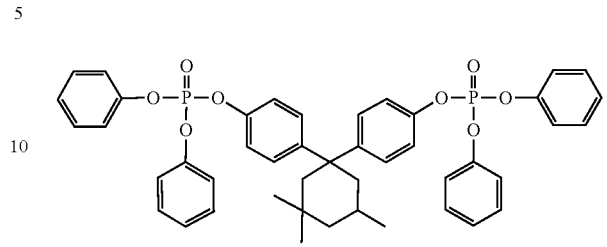

Test Example 1: Evaluation of Hydrolysis Resistance of Aromatic Phosphoric Acid Esters Aromatic phosphoric acid esters 1, 2, and 4 obtained in Synthesis Examples 2 to 4 as Examples were evaluated for hydrolysis resistance by the method described above together with, as Comparative Examples, Synthesis Examples 5 and 6 and aromatic phosphoric acid esters 8, 9, and 10, which are already known or commercially available as flame retardants. Table 1 and FIG. 1 show degradation rates (%) as the results thereby obtained.

TABLE 1

| Aromatic phosphoric acid esters | Degradation rates (%) |
| --- | --- |
| Aromatic phosphoric acid esters 1 | 1.7 |
| Aromatic phosphoric acid esters 2 | 1.1 |
| Aromatic phosphoric acid esters 4 | 1.8 |
| Aromatic phosphoric acid esters 5 | 40.5 |
| Aromatic phosphoric acid esters 6 | 31.7 |
| Aromatic phosphoric acid esters 8 | 4.9 |
| Aromatic phosphoric acid esters 9 | 14.2 |
| Aromatic phosphoric acid esters 10 | 33.9 |

It is found from the results shown in Table 1 and FIG. 1 that aromatic phosphoric acid esters 1, 2, and 4 (Examples), which are the flame retardants of the present invention, are clearly superior in hydrolysis resistance to traditionally-known aromatic phosphoric acid esters 5, 6, and 8 to 10 (Comparative Examples).

Also, it is easy to infer from these results that aromatic phosphoric acid esters 1, 2, and 4, which are the flame retardants of the present invention, have less effect on the hydrolysis resistance of the resin composition than the traditionally-known aromatic phosphoric acid esters.

Test Example 2: Evaluation of Aromatic Phosphoric Acid Esters in PC/ABS Resin A PC/ABS resin as a resin, aromatic phosphoric acid esters as flame retardants, and PTFE as a flame retardant additive were used in a blending ratio shown in Table 2, and were poured into a twin-screw kneading machine (model: KZW15TW-45MG, manufactured by Technovel Corporation) and kneaded at a temperature of 230 to 250° C., obtaining pellets.

The pellets thereby obtained were evaluated for heat flowability as resin compositions by the above method.

Also, the pellets obtained were poured into an injection molding machine (model: FN-2000, manufactured by Nissei Plastic Industrial Co., Ltd.), obtaining test pieces for measuring flame retardancy and heat resistance.

The test pieces thereby obtained were evaluated for the flame retardancy and the heat resistance by the above method.

The results obtained by the measurements are shown in Table 2, along with the resin, the flame retardants, and the flame retardant additive, together with their blending ratio.

to 6) containing the traditionally-known aromatic phosphoric acid esters as the flame retardants, both are equal in heat resistance; however, the former are superior in heat flowability.

From these perspectives, it can be concluded that imparting aromatic phosphoric acid esters 1 and 2, which are

TABLE 2

| | | | Examples | | | | Comparative Examples | | | | | | | |
|---|---|---|---|---|---|---|---|---|---|---|---|---|---|---|
| | | | 1 | 2 | 3 | 4 | 1 | 2 | 3 | 4 | 5 | 6 | 7 | 8 |
| Materials | Resin | PC/ABS | 100 | 100 | 100 | 100 | 100 | 100 | 100 | 100 | 100 | 100 | 100 | 100 |
| | Flame retardants | APAE* 1 | 20 | 22 | | | | | | | | | | |
| | | APAE* 2 | | | 20 | 22 | | | | | | | | |
| | | APAE* 5 | | | | | 18 | | | | | | | |
| | | APAE* 6 | | | | | | 20 | | | | | | |
| | | APAE* 7 | | | | | | | 20 | 23 | | | | |
| | | APAE* 8 | | | | | | | | | 20 | 22 | | |
| | | APAE* 9 | | | | | | | | | | | 16 | |
| | | APAE* 10 | | | | | | | | | | | | 18 |
| | Flame retardant additive | PTFE | 0.4 | 0.4 | 0.4 | 0.4 | 0.4 | 0.4 | 0.4 | 0.4 | 0.4 | 0.4 | 0.4 | 0.4 |
| Evaluations | Flame retardancy | UL-94 (1/8") | V-0 | V-0 | V-0 | V-0 | V-0 | V-0 | V-0 | V-0 | V-0 | V-0 | V-0 | V-0 |
| | Heat resistance | HDT (1.8 MPa) (° C.) | 92.3 | 92.7 | 95.4 | 94.1 | 85.4 | 88.6 | 97.4 | 95.6 | 93.8 | 91.0 | 88.4 | 83.2 |
| | heat flowability | MFR (230° C., 5.00 kg) (g/10 min) | 25.0 | 25.7 | 25.8 | 25.3 | 18.2 | 17.3 | 14.1 | 16.6 | 13.4 | 16.9 | 12.6 | 18.2 |

*APAE: Aromatic phosphoric acid ester

The following are found from the results shown in Table 2:

Comparing the resin compositions (Examples 1 to 4) containing the flame retardants of the present invention with the resin compositions (Comparative Examples 1, 7, and 8) containing the traditionally-known aromatic phosphoric acid esters as the flame retardants, the latter are lower in heat resistance than Examples in spite of the small amount of the aromatic phosphoric acid esters added; and the former aromatic phosphoric acid esters impart the good heat resistance to the resin. Also, it is easily predicted that the heat resistance of the latter would further deteriorate if the amount of the aromatic phosphoric acid esters is increased to make the heat flowability of the latter equal to that of the former.

Comparing the resin compositions (Examples 1 and 3) containing the flame retardants of the present invention with the resin composition (Comparative Example 2) containing the traditionally-known aromatic phosphoric acid ester as the flame retardant, the former are clearly superior in heat resistance and heat flowability to the latter.

Comparing the resin compositions (Examples 1 to 4) containing the flame retardants of the present invention with the resin compositions (Comparative Examples 3 to 6) containing the traditionally-known aromatic phosphoric acid esters as the flame retardants, both are equal in heat resistance; however, the former are superior in heat flowability.

the flame retardants of the present invention, to the resin compositions can achieve the superiority in both heat resistance and heat flowability to the traditionally-known aromatic phosphoric acid esters 5 to 10.

Test Example 3: Evaluation of Bleed Resistance of PBT

A PBT resin as a resin and aromatic phosphoric acid esters as flame retardants were used in a blending ratio shown in Table 3, and were poured into a twin-screw kneading machine (model: KZW15TW-45MG, manufactured by Technovel Corporation) and kneaded at a temperature of 230 to 250° C., obtaining pellets.

The pellets thereby obtained were poured into an injection molding machine (model: FN-2000, manufactured by Nissei Plastic Industrial Co., Ltd.), obtaining test pieces for measuring flame retardancy and bleed resistance.

The test pieces thereby obtained were evaluated for the flame retardancy and the bleed resistance by the above method.

The results obtained by the measurements are shown in Table 3, along with the resin and the flame retardants, together with their blending ratio.

TABLE 3

| | | | Examples | | Comparative Examples | | |
|---|---|---|---|---|---|---|---|
| | | | 5 | 6 | 9 | 10 | 11 |
| Materials | Resin | PBT | 100 | 100 | 100 | 100 | 100 |
| | Flame retardants | Aromatic phosphoric acid ester 1 | 25 | | | | |

TABLE 3-continued

|  |  |  | Examples | | Comparative Examples | | |
|---|---|---|---|---|---|---|---|
|  |  |  | 5 | 6 | 9 | 10 | 11 |
|  |  | Aromatic phosphoric acid ester 2 |  | 25 |  |  |  |
|  |  | Aromatic phosphoric acid ester 5 |  |  | 25 |  |  |
|  |  | Aromatic phosphoric acid ester 8 |  |  |  | 25 |  |
|  |  | Aromatic phosphoric acid ester 9 |  |  |  |  | 25 |
| Evaluations | Flame retardancy | UL-94 (1/8") | V-2 | V-2 | V-2 | V-2 | V-2 |
|  | Bleed resistance | Mass reduction rate(%) | 0.083 | 0.048 | 0.87 | 0.25 | 1.87 |

Comparing the resin compositions (Examples 5 and 6) containing the flame retardants of the present invention with the resin compositions (Comparative Examples 9 to 11) containing the traditionally-known aromatic phosphoric acid esters as the flame retardants, it is found from the results shown in Table 3 that the former are significantly superior in bleed resistance to the latter.

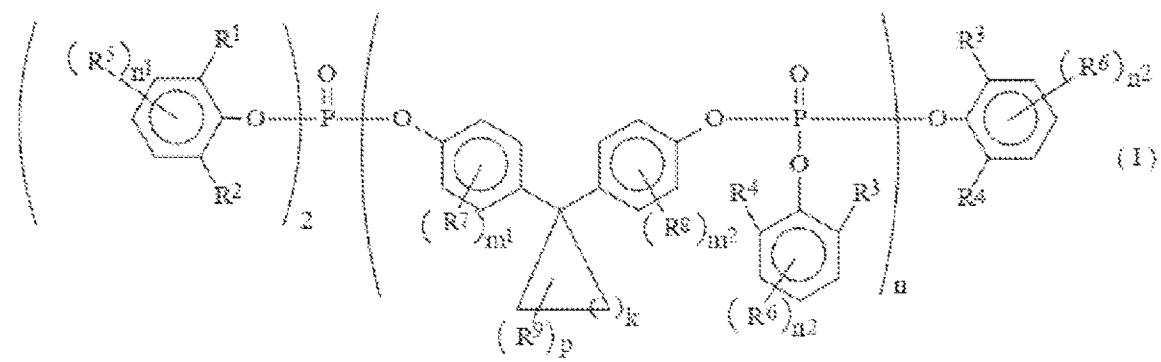

The invention claimed is:

1. A flame retardant containing an aromatic phosphoric acid ester represented by the general formula (II):

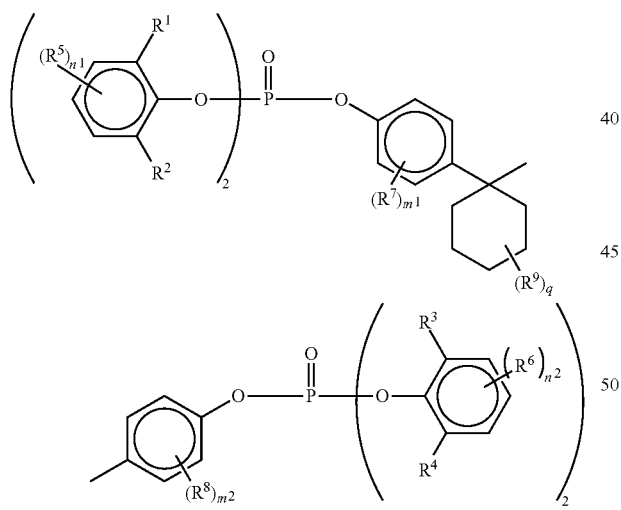

(II)

wherein $R^1$ to $R^4$, $R^7$, and $R^8$ each independently represent a $C_{1-4}$ alkyl group or a $C_{1-4}$ alkoxy group; $R^5$, $R^6$, and $R^9$ each independently represent a $C_{1-10}$ alkyl group or a $C_{1-10}$ alkoxy group; $n^1$ and $n^2$ each independently represent an integer of 0 to 3; $m^1$ and $m^2$ each independently represent an integer of 0 to 4; and q represents an integer of 0 to 10; and when q is 2 or more, any two substituents $R^9$ may be bonded to each other, and may be bonded to a carbon atom(s) of a ring to which the above substituents $R^9$ are bonded, forming another ring, wherein the aromatic phosphoric acid ester is:
aromatic phosphoric acid ester 1 represented by the following formula:

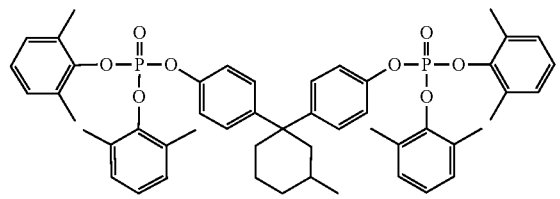

aromatic phosphoric acid ester 2 represented by the following formula:

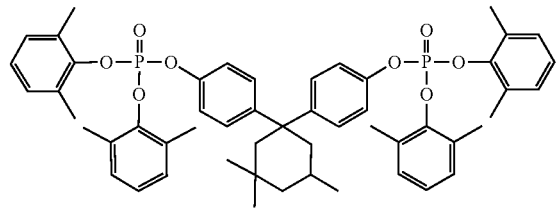

or aromatic phosphoric acid ester 3 represented by the following formula:

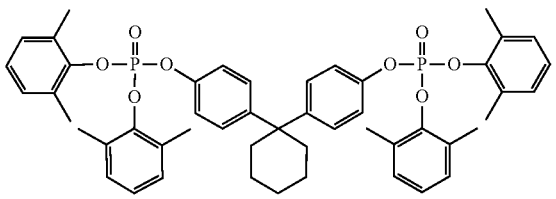

2. A thermoplastic resin composition containing the flame retardant defined in claim 1 and a thermoplastic resin.

3. The thermoplastic resin composition according to claim 2, wherein the thermoplastic resin is a polycarbonate resin.

4. The thermoplastic resin composition according to claim 3, further containing a styrene resin.

5. The thermoplastic resin composition according to claim 2, wherein the thermoplastic resin is a polyester resin.

6. The thermoplastic resin composition according to claim 5, wherein the polyester resin is polybutylene terephthalate.

7. The thermoplastic resin composition according to claim 2, wherein an amount of the flame retardant is 1 to 50 parts by mass with respect to 100 parts by mass of the thermoplastic resin.

* * * * *

UNITED STATES PATENT AND TRADEMARK OFFICE
CERTIFICATE OF CORRECTION

PATENT NO. : 11,459,446 B2
APPLICATION NO. : 16/965818
DATED : October 4, 2022
INVENTOR(S) : H. Tsuji et al.

Page 1 of 3

It is certified that error appears in the above-identified patent and that said Letters Patent is hereby corrected as shown below:

In the Claims

Column 23, Lines 35-55 Claim 1, Lines 3-23 change:

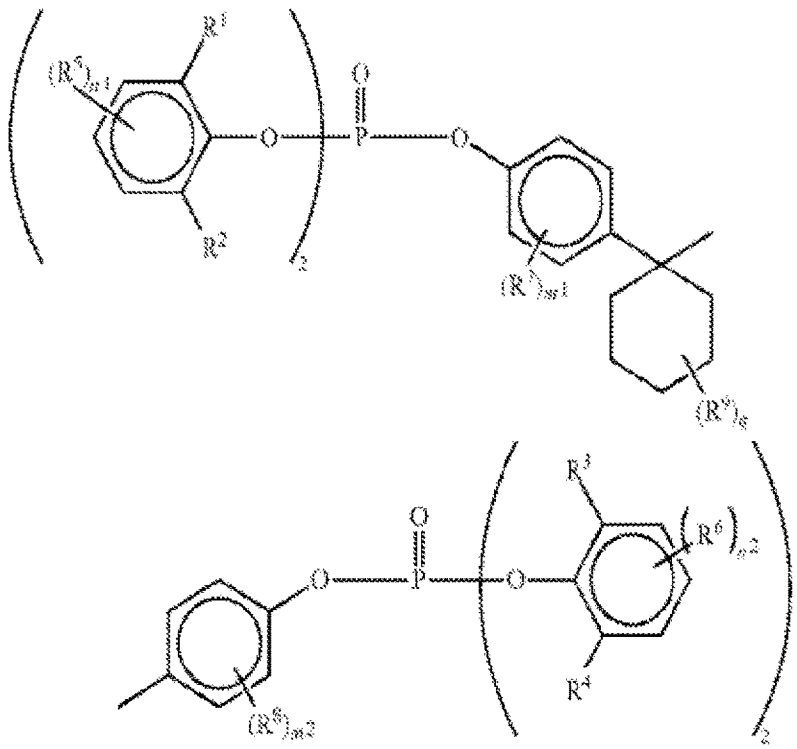

To:

Signed and Sealed this
Twenty-fifth Day of April, 2023

Katherine Kelly Vidal
*Director of the United States Patent and Trademark Office*

CERTIFICATE OF CORRECTION (continued)
U.S. Pat. No. 11,459,446 B2

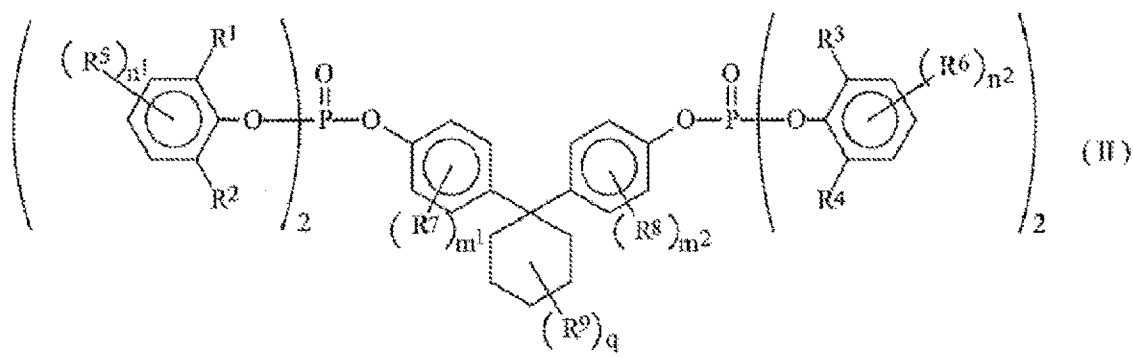

Abstract, chemical formula on page 2, Column 1, beginning on Line 1, please change:

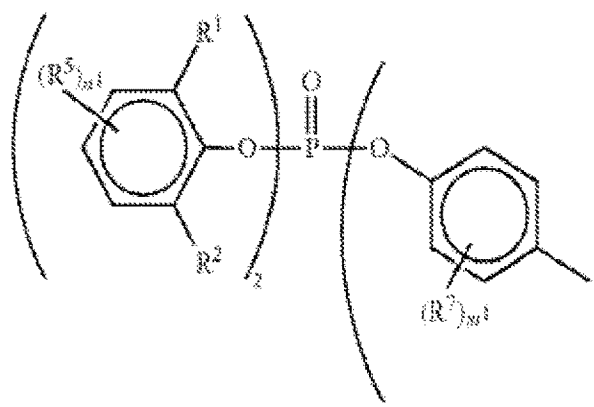

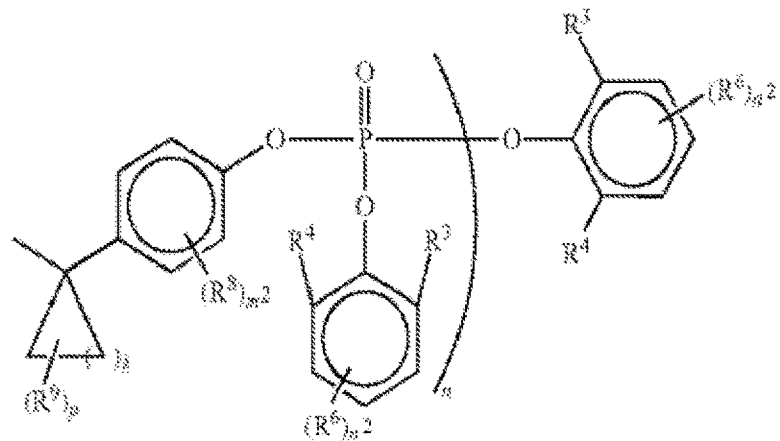

To: